(12) United States Patent
Singh Bawa et al.

(10) Patent No.: US 11,316,743 B2
(45) Date of Patent: Apr. 26, 2022

(54) NETWORK BANDWIDTH MANAGEMENT

(71) Applicant: ACCENTURE GLOBAL SOLUTIONS LIMITED, Dublin (IE)

(72) Inventors: Gurpreet Singh Bawa, Gurgaon (IN); Kaustav Pakira, Mumbai (IN); Souvik Chakraborty, Kolkata (IN); Rebecca Lynn Ruliffson, Manhattan, KS (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 143 days.

(21) Appl. No.: 16/808,865

(22) Filed: Mar. 4, 2020

(65) Prior Publication Data
US 2021/0281486 A1 Sep. 9, 2021

(51) Int. Cl.
*H04L 41/0896* (2022.01)
*G06N 20/00* (2019.01)
*G06F 16/2458* (2019.01)
*G06N 7/00* (2006.01)
*H04L 47/125* (2022.01)

(52) U.S. Cl.
CPC ...... *H04L 41/0896* (2013.01); *G06F 16/2474* (2019.01); *G06N 7/005* (2013.01); *G06N 20/00* (2019.01); *H04L 47/125* (2013.01)

(58) Field of Classification Search
CPC ... H04L 41/0896; H04L 47/125; G06N 20/00; G06N 7/005; G06F 16/2474
USPC ................................. 709/217, 226
See application file for complete search history.

(56) References Cited

U.S. PATENT DOCUMENTS 7,251,589 B1   7/2007 Crowe et al.
8,010,394 B2   8/2011 Wan
(Continued)

FOREIGN PATENT DOCUMENTS

EP   3467661 A1   4/2019

OTHER PUBLICATIONS

Zhou, Bo, Dan He, Zhili Sun, and W. Hock Ng. "Network traffic modeling and prediction with ARIMA/GARCH." In Proc. of HET-NETs Conference, pp. 1-10. 2005. (Year: 2005).*
(Continued)

*Primary Examiner* — Suraj M Joshi
*Assistant Examiner* — Melaku Y Habtemariam
(74) *Attorney, Agent, or Firm* — Mannava & Kang, P.C.

(57) ABSTRACT

Examples of network bandwidth management are provided. A system may access, time series distribution data including a distribution of data points corresponding to an average count of network packets. Further, the system may determine, from the time series distribution data, trend data component, seasonal data component, cyclical data component, and irregular data component. Furthermore, the system may compute, baseline distribution traffic data based on the trend data component, the cyclical data component, and the seasonal data component. Furthermore, the system may identify auto regression data component and moving average data component based on the irregular data component. The system may further, determine an estimated network traffic for a future time interval based on the baseline distribution traffic data, a lagged covariate factor, and covariate metrics. Furthermore, the system may provide the estimated bandwidth based on the estimated network traffic to configure the server.

20 Claims, 24 Drawing Sheets

(56) References Cited

U.S. PATENT DOCUMENTS

| | | | |
|---|---|---|---|
| 2009/0138301 A1* | 5/2009 | Wan | G06Q 30/0202 |
| | | | 705/7.31 |
| 2009/0198559 A1 | 8/2009 | Wang et al. | |
| 2010/0082172 A1* | 4/2010 | Ko | G06Q 30/02 |
| | | | 700/291 |
| 2016/0323158 A1 | 11/2016 | Hu et al. | |
| 2018/0241812 A1* | 8/2018 | Marchetti | H04L 67/1023 |
| 2018/0300737 A1* | 10/2018 | Bledsoe | G06F 16/248 |
| 2019/0379589 A1* | 12/2019 | Ryan | G06N 3/082 |
| 2019/0379592 A1* | 12/2019 | Samadi | H04L 43/14 |

OTHER PUBLICATIONS

Vinayakumar, R., K. P. Soman, and Prabaharan Poornachandran. "Applying deep learning approaches for network traffic prediction." In 2017 International Conference on Advances in Computing, Communications and Informatics (ICACCI), pp. 2353-2358. IEEE, 2017. (Year: 2017).*

Muhammad Faisal IQBAL et al., "Efficient Prediction of Network Traffic for Real-Time Applications", Hindawi, Journal of Computer Networks and Communications, vol. 2019, Article ID 4067135, 11 pages, published Feb. 4, 2019.

Wucherl Yoo et al., "Network Bandwidth Utilization Forecast Model on High Bandwidth Networks", 2015 International Conference on Computing, Networking and Communications (ICNC), IEEE, Feb. 19, 2015, 5 pages.

T.H. Szymanski et al., "Traffic Provisioning in a Future Internet", IEEE ICC Workshop Futurenet V, Ottawa, Canada, Jun. 2012, 7 pages.

Qingsong Wen et al., "RobustSTL: A Robust Seasonal-Trend Decomposition Algorithm for Long Time Series", arxiv.org, Cornell University Library, Dec. 5, 2018, 9 pages.

* cited by examiner

1700

Decompose, from the time series distribution data, a trend data component, a seasonal data component, a cyclical data component, and an irregular data component 1702

Compute baseline distribution traffic data, where the baseline distribution data is a function of: the trend data component, the seasonal data component, and the cyclical data component 1704

FIG. 17

NETWORK BANDWIDTH MANAGEMENT

BACKGROUND

Internet traffic has grown tremendously in the past decade due to the advent of new technologies, industries, and applications. As a result, the use of online platforms such as, for example, web services, web portals, e-commerce platforms, etc., by users has also grown rapidly, which in turn has increased the demand for data and content hosted and transacted through such platforms. With the increase in network traffic, also commonly known as web traffic, there is a need to increase the computational capability of machines, such as web servers, supporting these platforms while at the same time managing the bandwidth utilized by these machines effectively. A number of approaches have been deployed to manage the bandwidth used by such machines to enhance their efficiency.

Many existing approaches for managing network bandwidth involve the forecasting of network traffic for a future time period. However, estimating network traffic for a future time period may be challenging and may have certain limitations. For instance, some existing approaches for estimating network traffic in the future rely on collecting historical network traffic data and analyzing, for example, by using techniques such as, for example, linear regression on the historical network traffic data. Typically, these approaches are based on many assumptions and projections from the historical network traffic data. Estimating the network traffic for the future time period based on the assumptions is usually error prone and often results in inaccurate prediction of the network traffic. An inefficient estimation of the expected network traffic in future may consequently lead to poor bandwidth management and eventually poor user experience. Accordingly, there is a need to efficiently forecast network traffic in a consistent manner irrespective of ever increasing network traffic demand and spontaneous changing of patterns in the network traffic.

Accordingly, a technical problem with the currently available systems for network bandwidth management for web servers is that the estimation of expected network traffic at the future time may be inefficient, inaccurate, and/or not relevant to support effective network bandwidth management. There is a need for a network bandwidth handler system to effectively manage network bandwidth based on accurate network traffic forecasting.

BRIEF DESCRIPTION OF DRAWINGS

FIGS. 16-21 illustrate process flowcharts for a system for network bandwidth management, according to an example embodiment of the present disclosure.

DETAILED DESCRIPTION

Figure 1:
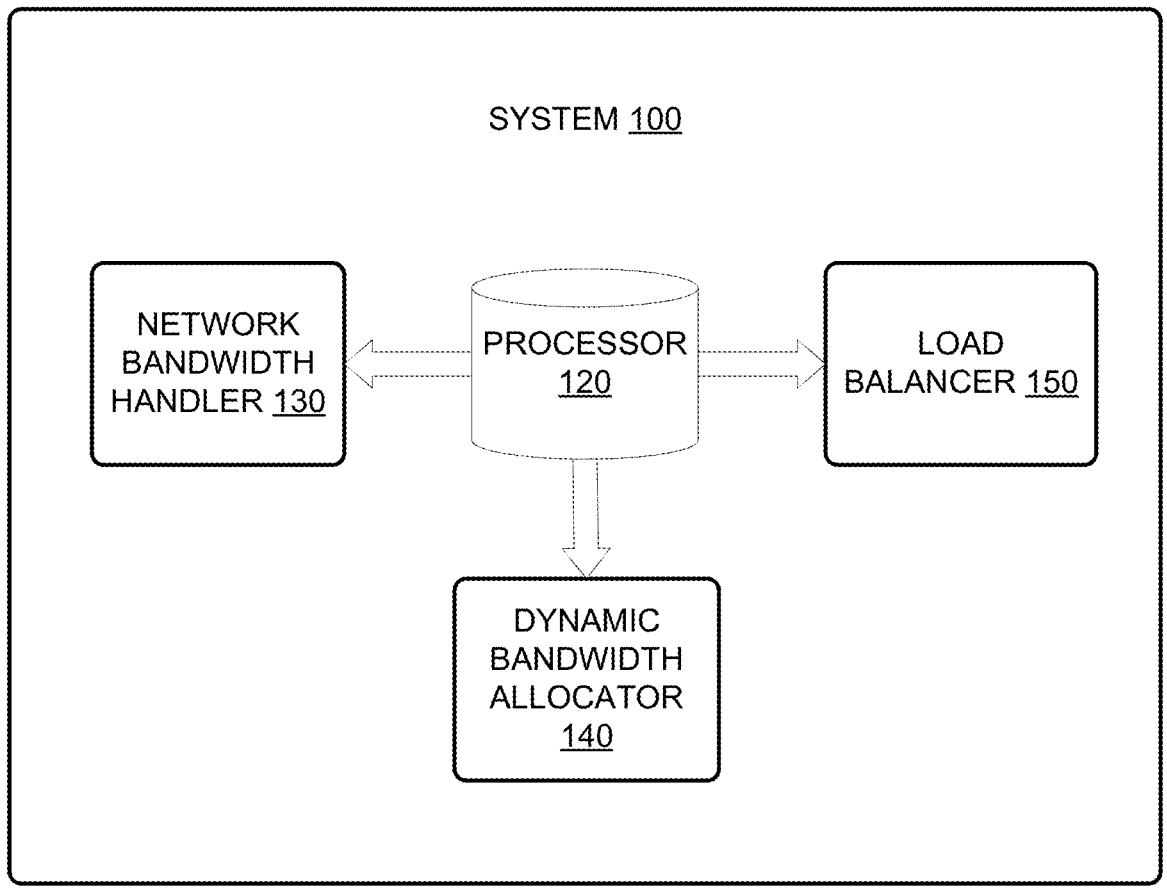
FIG. 1 illustrates a diagram for a system for network bandwidth management, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

1. Overview

Typically, bandwidth requirement of a server supporting a web service, such as, a website, a web page etc., can be expressed as a function of network traffic. Existing approaches for determining bandwidth requirement for a web server are based on forecasting network traffic for the future and by using several other factors such as, for example, the size of web pages provisioned by the web server, the computational capability of the web server supporting a web service, or the type of content on the web pages. Existing approaches for forecasting network traffic involve analyzing historical data i.e. past trend of network traffic or web demand by using various models such as, for example, a local trend model, a local seasonal model, or an intermittent demand model. Although existing approaches for network traffic forecasting involves analysis of historical network traffic, however, these approaches are usually based on certain assumptions. For instance, in some approaches, forecasting network traffic may not consider factors that may impact a portion of the network traffic, which cannot be defined in terms of any visible trend, pattern, seasonal or cyclic phase of usual traffic demand. Accordingly, network traffic estimation determined in such approaches may be inaccurate and may result in poor network bandwidth management, thereby causing server outages and loss of service by the server.

The present disclosure describes systems and methods for network bandwidth management. A system for network bandwidth management may be used to provide an estimated network bandwidth for a future time point. The system may provide a structured scheme for managing network bandwidth utilization for example, but not limited to, web servers, web services, web applications, web platforms, web portals, e-commerce websites, and/or the like. In some examples, the system may enable modelling of chronological information and historical network traffic data to accurately forecast expected network traffic in future, also referred to as estimated network traffic. Based on the estimated network traffic, the system may also provide an estimated bandwidth i.e. an estimation of bandwidth for the server that may be used in the future. The estimated bandwidth may be used to, for example, automatically, configure or re-configure configuration settings of the server. Furthermore, the system may dynamically allocate bandwidth to the server, based on the bandwidth estimation. The allocated bandwidth to the server may be changed dynamically based on changing network traffic during different cycles or intervals over a period of time.

In some examples, the system may include various components, for example, a processor, a network bandwidth handler, a dynamic bandwidth allocator, and a load balancer to manage network bandwidth for the server. According to an example implementation of the present disclosure, the system may handle bandwidth of the server based on one or more operations performed by these components.

A network bandwidth handler of the system may access a time series distribution data including a distribution of data points. The distribution of data points, as referred herein, may indicate an average count of network packets collected over a pre-defined time period. The average count of network packets may be representative of network traffic at a server. In some examples, the pre-defined time period may be defined based on for instance, but not limited to, a user input, an application context, a business rule, etc. Furthermore, the network bandwidth handler may determine, from the time series distribution data, one or more data components indicative of portions of network traffic contributed due to various factors. For instance, the network bandwidth handler may decompose the time series distribution data to determine data components like, a trend data component, a seasonal data component, a cyclical data component, and an irregular or residual data component, from the time series distribution data.

The trend data component may include a distribution of a first set of data points indicative of a development or inherent trend of a first portion of the network traffic over the pre-defined time period. The seasonal data component may include a distribution of a second set of data points indicative of a second portion of the network traffic. The second set of data points may be indicative of a recurring and persistent change in a pattern of the second portion of the network traffic. Likewise, the cyclical data component may include a distribution of a third set of data points indicative of a third portion of the network traffic developed due to a predefined operational rule. Furthermore, the irregular data component may include a fourth set of data points indicative of a fourth portion of the network traffic undefined by a definitive external factor.

In accordance with said example implementation of the present disclosure, the network bandwidth handler may compute a baseline distribution traffic data indicative of a base count of network packets over the pre-defined time period. The baseline distribution traffic data may be computed based on the trend data component, the cyclical data component, and the seasonal data component.

In an example, various traffic data components described herein may be influenced by a number of external factors, also referred herein as covariate metrics. The covariate metrics may represent one or more external factors contributing to the network traffic over the pre-defined time period. For instance, in some examples, the covariate metrics may correspond to a size of a web page, a non-seasonal promotion, a count of images on the web page, a capability of the server hosting the web page, a load time interval for loading the web page, a ranking of the web page, a performance of a search optimizer coupled to the server, or other relevant factors.

The network bandwidth handler may further identify from the irregular or residual data component, an auto regression data component and a moving average data component. The auto regression data component may correspond to a distribution of a fifth set of data points indicative of regression of the fourth set of data points over a lag time interval. Furthermore, the moving average data component may correspond to a distribution of a sixth set of data points indicative of regression of error values of the fourth set of data points over the lag time interval.

Additionally, the network bandwidth handler may also determine, an estimated network traffic for a future time interval based on the baseline distribution traffic data, a lagged covariate factor, and covariate metrics. The covariate metrics referred herein may correspond to other covariate factors for example, day part indicator, holiday indicator, etc. The lagged covariate factor may be determined based on the auto-regression data component and the moving average data component. The estimated network traffic may represent a forecast of expected network traffic in future. Furthermore, the network bandwidth handler may provide an estimated bandwidth for the future time interval based on a local weighted regression using a pre-defined smoothing parameter. The local weighted regression may be performed based on a local weighted scatter plot smoother model i.e. a LOESS model. In accordance with said example implementation of the present disclosure, the dynamic bandwidth allocator may allocate, network bandwidth to the server based on pre-stored network traffic data applicable for the server and the estimated bandwidth for the future time interval.

Accordingly, the present disclosure aims to provide an accurate forecasting of network traffic that may be expected at a server at a future point in time. Accurately forecasting the network traffic for future enables efficient network bandwidth management for the server. For example, based on an expected network traffic, bandwidth requirements for the server may be pre-planned. Efficiently planning bandwidth requirements, such as an estimated bandwidth for the server to cater web demand in future helps in avoiding server outage or instances of crashing of server, due to unexpected increase in network traffic or the web demand. Also, by analyzing the forecasted network traffic and estimated bandwidth for the server, any instances of anticipated server failure may be identified, and preventive actions may be taken well in advance accordingly. In case of anticipated server failure, some of the preventive actions that may be taken may include, for example, deploying more servers to cater to increasing web demand, increasing computational capability of the servers, reducing load on the server, performing load balancing, improving data connection speed and/or quality of the server, reconfiguring network settings of the server, etc.

2. System Description

FIG. 1 illustrates a system 100 for network bandwidth management, according to an example implementation of the present disclosure. In some examples, the system 100 may provide network bandwidth management for a server. The server may be for example, but not limited to, a web server or a server hosting a website or a web portal, and/or the like. The system 100 may include a processor 120. The processor 120 may be coupled to a network bandwidth handler 130, a dynamic bandwidth allocator 140, and a load balancer 150.

The network bandwidth handler 130 may correspond to a component that may handle bandwidth requirement for the server. For instance, according to an example, the network bandwidth handler 130 may handle bandwidth requirement for the server based on changing network traffic conditions, over a period of time. The network bandwidth handler 130 may predict or forecast expected network traffic in future to identify bandwidth requirement for the server. According to an example, the network bandwidth handler 130 may predict the expected network traffic by daypart, for instance, for different periods of a day, for example, morning, afternoon, or evening. In another example, the network bandwidth handler 130 may predict the expected network traffic for any pre-defined time interval. Furthermore, based on the expected network traffic, the network bandwidth handler 130 may provide an estimation of the bandwidth requirement for the server in the future i.e. for a future time instance.

The dynamic bandwidth allocator 140 may allocate network bandwidth to the server based on one or more factors. For instance, in one example, the dynamic bandwidth allocator 140 may allocate network bandwidth to the server based on a current network traffic or web demand. In another example, the dynamic bandwidth allocator 140 may allocate the network bandwidth to the server based on the expected network traffic i.e. forecasted network traffic. The dynamic bandwidth allocator 140 may access the expected network traffic from the network bandwidth handler 130. Furthermore, in another example, the dynamic bandwidth allocator 140 may allocate the network bandwidth to the server based on the expected network traffic along with one or more of other factors for example, but not limited to, a size of web pages, computational capability of the server, a type of content developing the network traffic, a priority associated with the network traffic, a buffer bandwidth value, etc. In some examples, the bandwidth allocation for the server may be a function of size of web pages hosted by the server, the estimated network traffic, and a buffer value. In other examples, bandwidth allocation to the server may be performed based on load balancing of the network traffic. The load balancer 150 of the system 100 may perform load balancing of the network traffic at the server.

The load balancer 150 may monitor a current network traffic at the server and further perform load balancing of the network traffic at the server based on monitored traffic, under various situations. For example, in one situation, when a bandwidth allocated to the server is insufficient to support the current network traffic, the load balancer 150 may perform load balancing of the network traffic. The load balancer 150 may perform a comparison of the allocated bandwidth to the server against a desired bandwidth based on the current network traffic. Accordingly, if the allocated bandwidth is determined to be less than the desired bandwidth, the load balancer 150 may perform the load balancing. In another example, the load balancer 150 may perform load balancing of the network traffic at several host servers based on current network traffic at the each of the several host servers and based on other factors. These factors may include, for example, expected network traffic, load history of the server, a type of content hosted by the server, etc. Further details of the load balancing by the load balancer 150 are described in reference to FIGS. 2, 3, and 14.

In accordance with an example implementation of the present disclosure, the system 100 may perform bandwidth estimation for the server for a future point in time. The network bandwidth handler 130 may access time series distribution data. The time series distribution data may comprise a distribution of data points over a pre-defined time period. The time series distribution data may represent the distribution of data points i.e. data values corresponding to an average count of network packets over the pre-defined time period. The average count of network packets may be indicative of network traffic directed at a server during the pre-defined time period. The time series distribution data may be collected in a required or defined format for example, in a chronological order, so as to perform analysis and modelling of the time series distribution data to eventually forecast the expected network traffic, details of which are described hereinafter.

The network bandwidth handler 130 may analyze the time series distribution data and identify one or more data components from the time series distribution data. The network bandwidth handler 130 may split or decompose the time series distribution data to obtain the various data components, based on an unobserved component model, which is described in further detail with reference to FIGS. 2-21. According to an example, the data components may be indicative of a distribution of one or more sets of data points collected over the pre-defined time period. Each set of the data points may represent a portion of the network traffic that may be developed at the server because of a key metric, details of which are described later in reference to FIGS. 2-21. The network bandwidth handler 130 may determine from the time series distribution data, (a) a trend data component, (b) a seasonal data component, (c) a cyclical data component, and/or (d) a residual or irregular data component. Each of these data components may be expressed as a stochastic process that may include random variables which may evolve over the pre-defined time period.

Figure 6A:
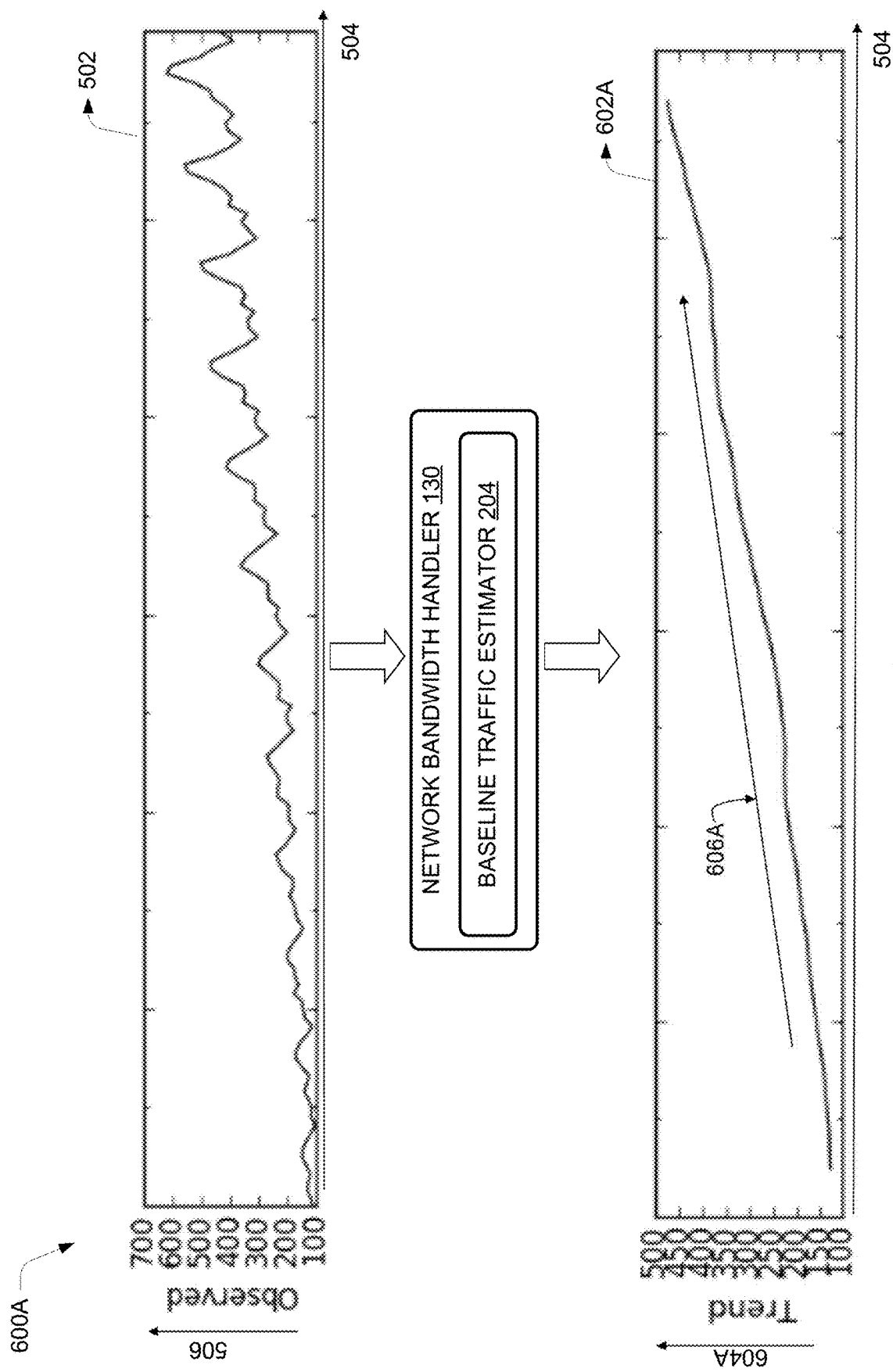
FIG. 6A illustrates a pictorial representation of an example of a trend data component of a time series distribution data, obtained by a baseline traffic estimator of a network bandwidth handler, according to an example embodiment of the present disclosure.
Figure 6B:
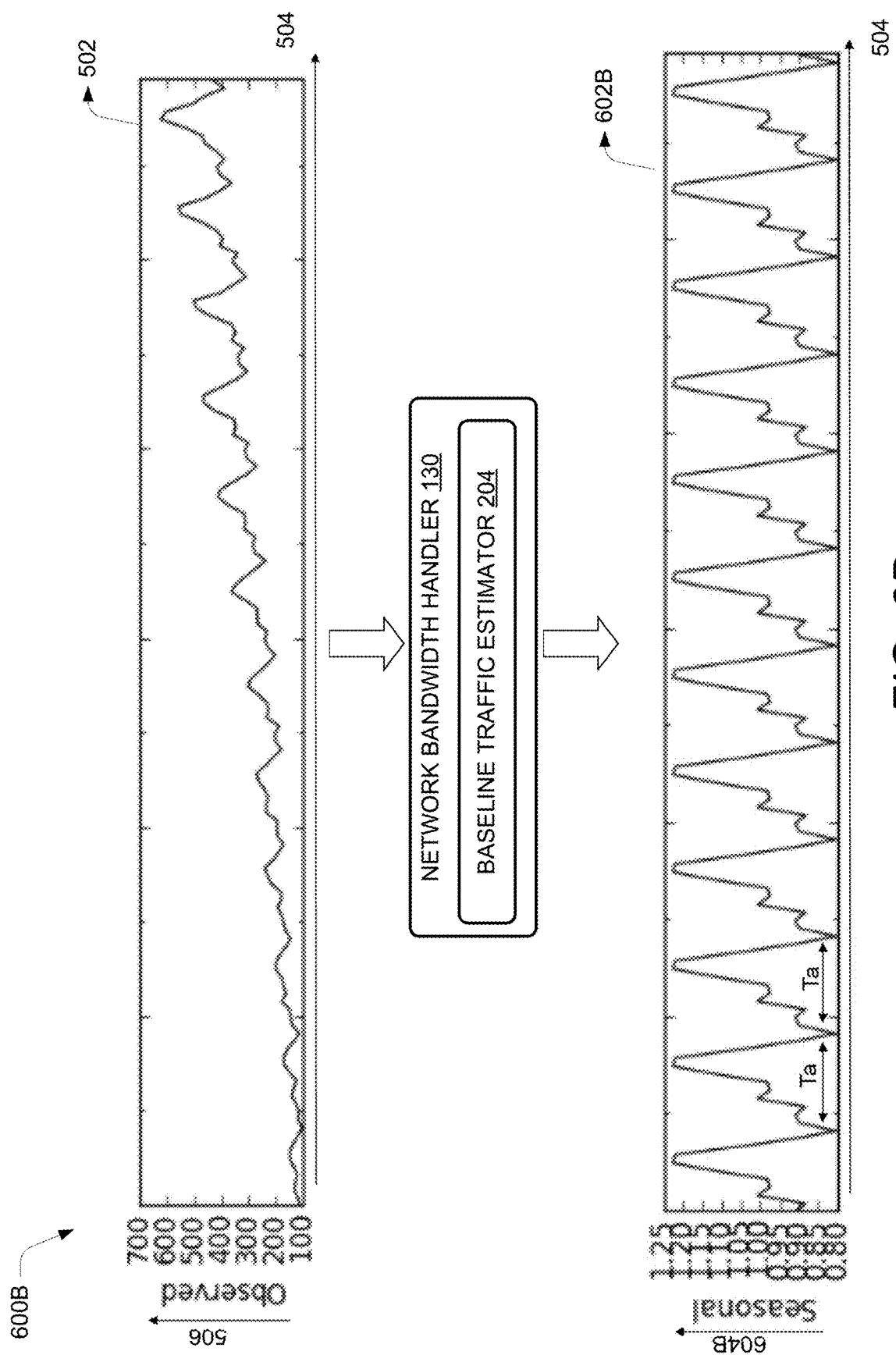
FIG. 6B illustrates a pictorial representation of an example of a seasonal data component of a time series distribution data, obtained by a baseline traffic estimator, according to an example embodiment of the present disclosure.
Figure 6C:
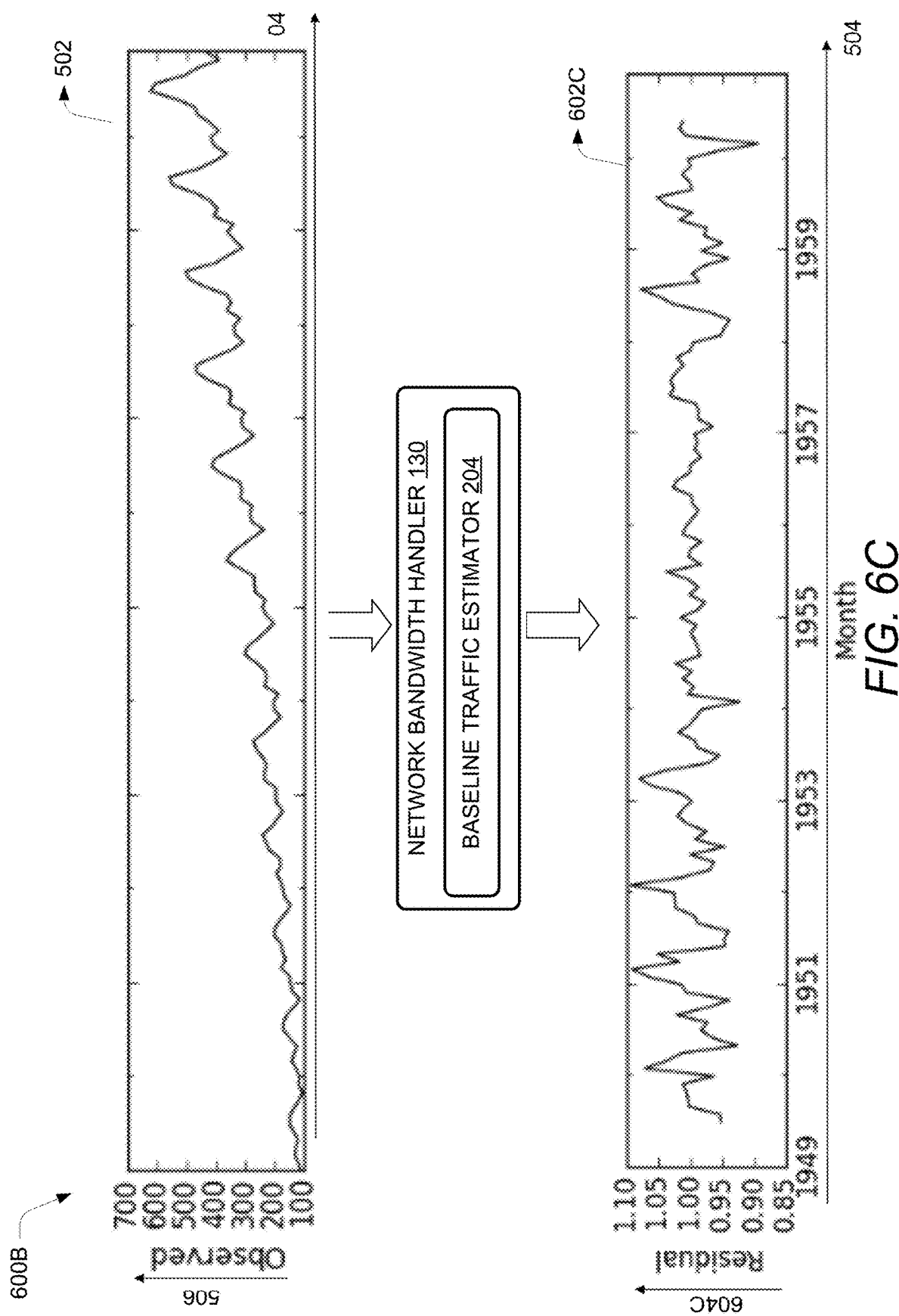
FIG. 6C illustrates a pictorial representation of an example of an irregular data component of a time series distribution data, identified by a baseline traffic estimator, according to an example embodiment of the present disclosure.
Figure 6D:
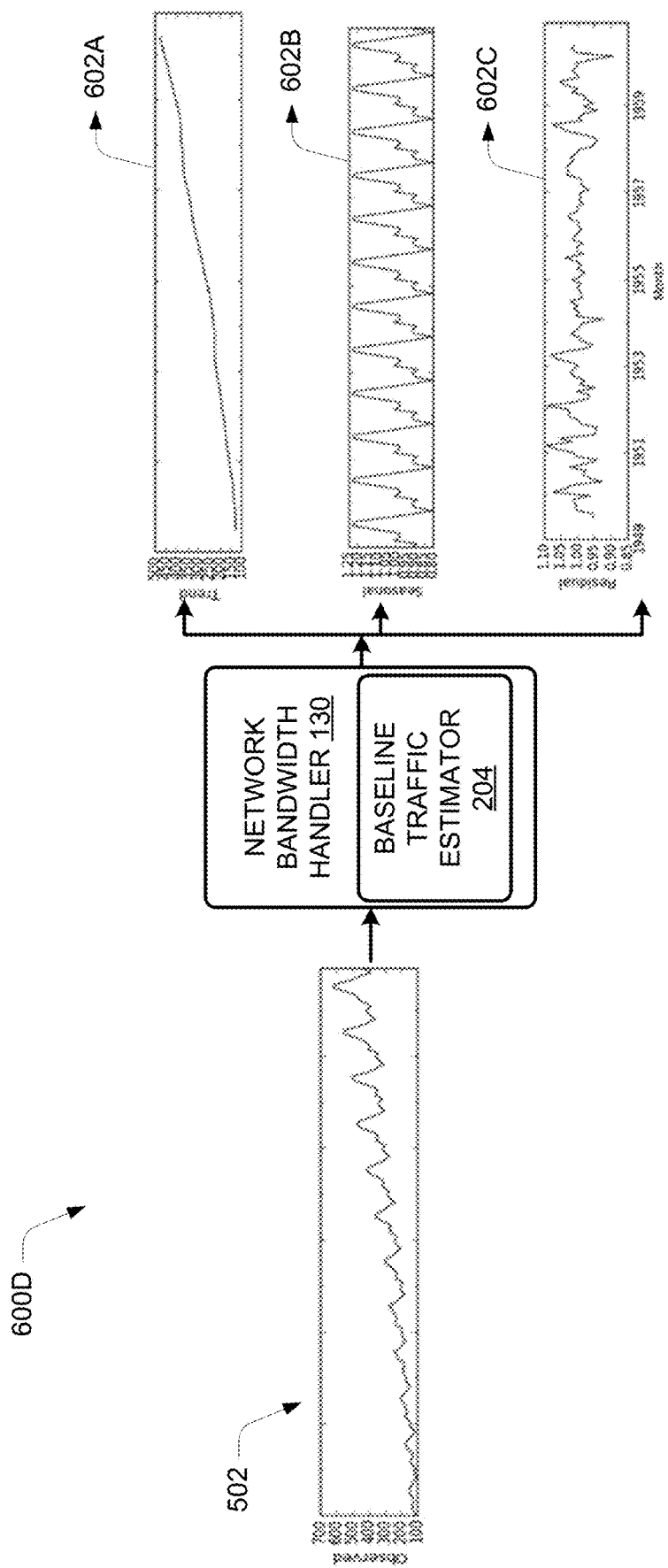
FIG. 6D illustrates a pictorial representation of decomposition of a time series distribution data to obtain trend data component, seasonal data component, cyclic data component, and an irregular data component, by a baseline traffic estimator, according to an example embodiment of the present disclosure.
Figure 11:
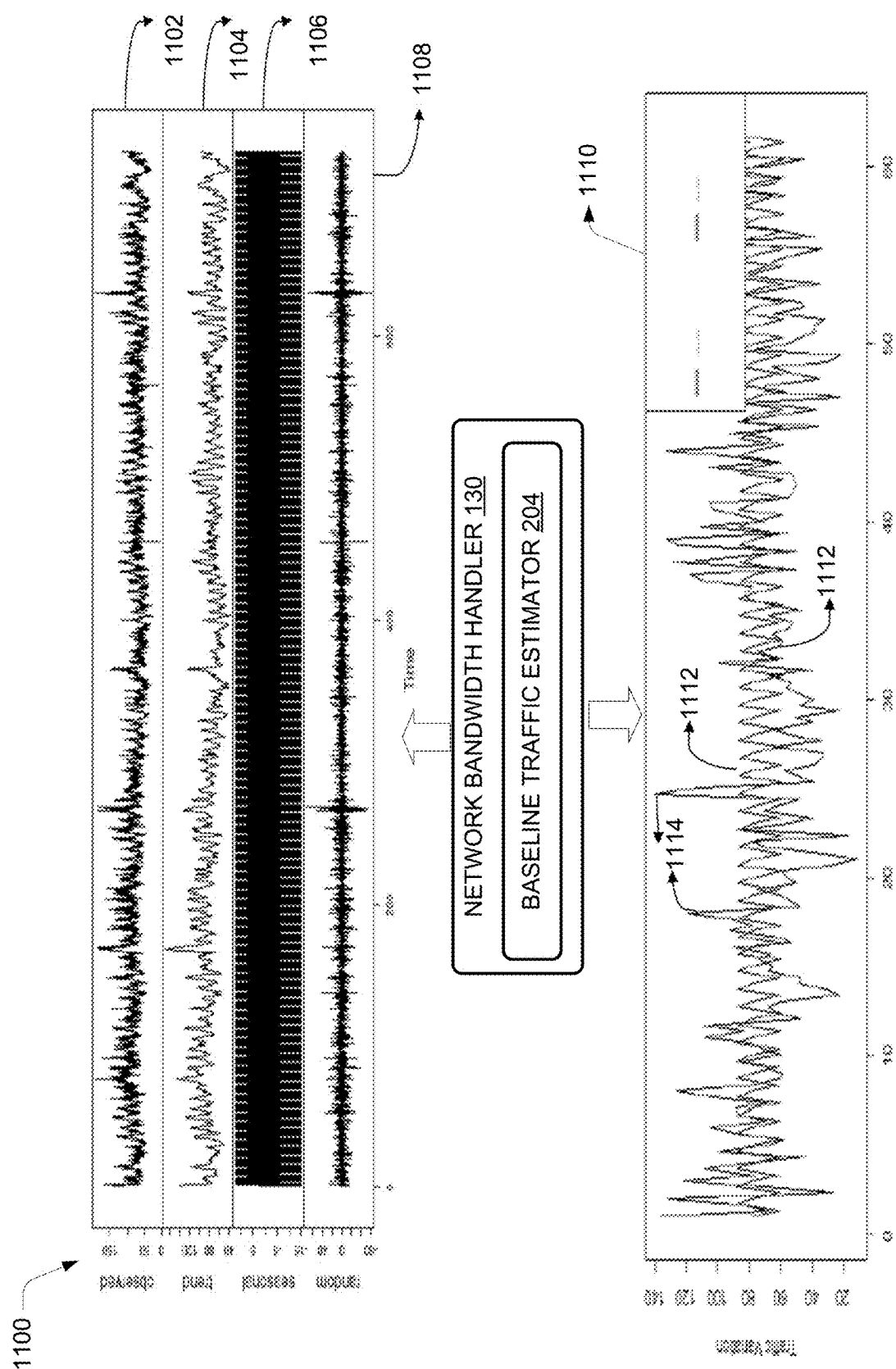
FIG. 11 illustrates a pictorial representation of baseline distribution traffic data computed by a network bandwidth handler, in an example use case, in accordance with an example embodiment of the present disclosure.

The trend data component may include a first set of data points. The first set of data points may correspond to an inherent trend or development of network traffic over a pre-defined time period. The first set of data points corresponding to the trend data component may be indicative of development of a first portion of the network traffic. For instance, the trend data component may be indicative of a linearly or non-linearly, increasing or decreasing trend of the network traffic, over the pre-defined time period. FIGS. 6A, 6D, and 11 illustrates pictorial representation of examples of the trend data component.

Furthermore, the seasonal data component may include a distribution of second set of data points collected over the pre-defined time period. The second set of data points may be indicative of a second portion of the network traffic. The second portion of the network traffic may correspond to a recurring and/or persistent change in a pattern of development of the network traffic at the server. The recurring and/or persistent change may be due to seasonal factors. For instance, the seasonal data component may correspond to a portion of the network traffic on an e-commerce website hosted by the server due to a promotional offer running during a festival period. FIGS. 6B, 6D, and 11 illustrates pictorial representation of examples of the seasonal data component.

Furthermore, the cyclical data component may include a distribution of a third set of data points. The third set of data points may be indicative of a third portion of the network traffic. The third portion of the network traffic may be developed due to a predefined operational rule. For instance, the predefined operational rule may correspond to a business rule. The third portion of the network traffic at the server may be developed due to users visiting the e-commerce website during end of a business cycle or a financial quarter for the e-commerce business. The third portion of the network traffic may correspond to the cyclical data component.

Accordingly, in accordance with various examples described herein, the network bandwidth handler 130 may obtain, from the time series distribution data, one or more data components representative of stochastic processes that may be explained in terms of any pattern, behavior, or visible observation i.e. trend, seasonal phase, cyclic phase etc. from past traffic data i.e. historical network traffic data. For purpose of brevity, the trend data component, the seasonal data component, and the cyclic data component may be collectively referred hereinafter as explainable data components, hereinafter throughout the description.

Furthermore, in accordance with various examples, the network bandwidth handler 130, upon identifying the explainable data components, may also identify a residual or left over data component. The residual or left over data component may be referred hereinafter as the irregular data component. The irregular data component may represent that portion of the network traffic that may not be explained in terms of any pattern, trend, or any visible behavior, in the historical network traffic data. The irregular data component may include a fourth set of data points collected over the pre-defined time period. The fourth set of data points may be indicative of a fourth portion of the network traffic. The fourth portion of the network traffic may correspond that portion of the network traffic which may be undefined or unexplained by a definitive external factor. FIGS. 6C, 6D, and 11 illustrates pictorial representation of examples of the irregular data component.

In accordance with an example implementation of the present disclosure, the network bandwidth handler 130 may compute a baseline distribution traffic data. The baseline traffic data may be indicative of a base count of network packets over the pre-defined time period. The network bandwidth handler 130 may compute the baseline distribution traffic data based on the explainable data components, i.e. the trend data component, the seasonal data component, and the cyclic data component. Further details of computing the baseline distribution traffic data are described in reference to FIGS. 2-21.

According to an example implementation of the present disclosure, the network bandwidth handler 130 may identify, from the irregular data component, an auto regression data component and a moving average data component. The auto regression data component may include a distribution of a fifth set of data points. The fifth set of data points may be indicative of regression of the fourth set of data points i.e. data points of the irregular data component over a lag time interval. Furthermore, the moving average data component may include a distribution of sixth set of data points. The sixth set of data points may be indicative of regression of error values of the fourth set of data points, over the lag time interval. In accordance with some examples, the identification of the auto regression data component and the moving average data component from the irregular data component, by the network bandwidth handler 130, may provide a definitive explanation to unexplained portion of the network traffic collected in form of the time series distribution data. Said differently, identification of the auto regression data component and the moving average data component may provide an explanation to portion of the network traffic that may be left over after removing the explainable components.

The auto regression data component identified by the network bandwidth handler 130 may be used to recognize a correlation between two data points of the fourth set of data points recorded at two different instances of time. The auto regression data component may provide a correlation between a first data point of the fourth set of data points with a second data point of the fourth set of data point. The second data point corresponds to a data value that may be recorded at a first time instance subsequent to a second time instance. A difference between data points at the first time instance and the second time instance, which are correlated may be referred as "lag time interval". The fifth set of data points i.e. data points corresponding to the auto regression data component may comprise such data points that may represent a regression of some data points of the fourth set of data points, over the lag time interval.

According to an example, to forecast the expected network traffic, along with computing the baseline distribution traffic data, the network bandwidth handler 130 may identify the auto regression data component of the time series distribution data. Identification of the auto regression data component enables that an evolving variable of interest i.e. the fourth portion of the network traffic may be regressed upon its own lagged or prior values. Further details of the auto regression data component are described in reference to FIGS. 2-21.

As stated earlier, the network bandwidth handler 130 may identify the moving average data component from the irregular data component. The moving average data component may be used to recognize a correlation between error versions of two data points of the fourth set of data points at two different instances of time. For example, the moving average data component provides a correlation between a third data point of the fourth set of data points with a fourth data point of the fourth set of data point. The third data point and the fourth data point corresponds to error versions of respective data values recorded at two time instances. Said differently, the third data point represents an error version of an average count of network packets recorded at a third time interval and the fourth data point represents an error version of an average count of network packets that may be recorded at a fourth time interval. The fourth time interval may be subsequent to the third time interval. In other words, a difference between the fourth time interval and the third time interval may be referred as a second lag time interval. Thus, the sixth set of data points corresponding to the moving average data component may include data points representing regression of some error versions of data points of the fourth set of data points, over a lag time interval. In accordance with some examples, the identification of the moving average data component, by the network bandwidth handler 130, enables that the unexplained portion i.e. the irregular data component holds a linear relationship with forecasted error terms. In other words, the data points corresponding to the sixth set lags upon previous error versions. Furthermore, based on the auto-regression data component and the moving average data component, the network bandwidth handler 130 may determine the lagged covariate factor. The lagged covariate factor may be used along with other components, by the network bandwidth handler 130, to estimate future network traffic.

In accordance with said example implementation, the network bandwidth handler 130 may determine, an estimated network traffic for a future time point. The network bandwidth handler 130 may determine the estimated network traffic based on the data components computed by the network bandwidth handler 130. For example, the network bandwidth handler 130 may determine the estimated network traffic based on the baseline distribution traffic data, a lagged covariate factor, and covariate metrics. The network bandwidth handler 130 may perform a local weighted regression to determine the estimated network traffic. The local weighted regression may be performed using a LOESS model, which may utilize a smoothing parameter, further details of which are described later in reference to FIGS. 2-21.

Furthermore, the network bandwidth handler 130 may provide an estimated bandwidth for the server for a future time period. The network bandwidth handler 130 may provide the estimated bandwidth for the server based on the estimated network traffic and/or other factors which are described in more details in description of FIGS. 2-21.

Figure 2:
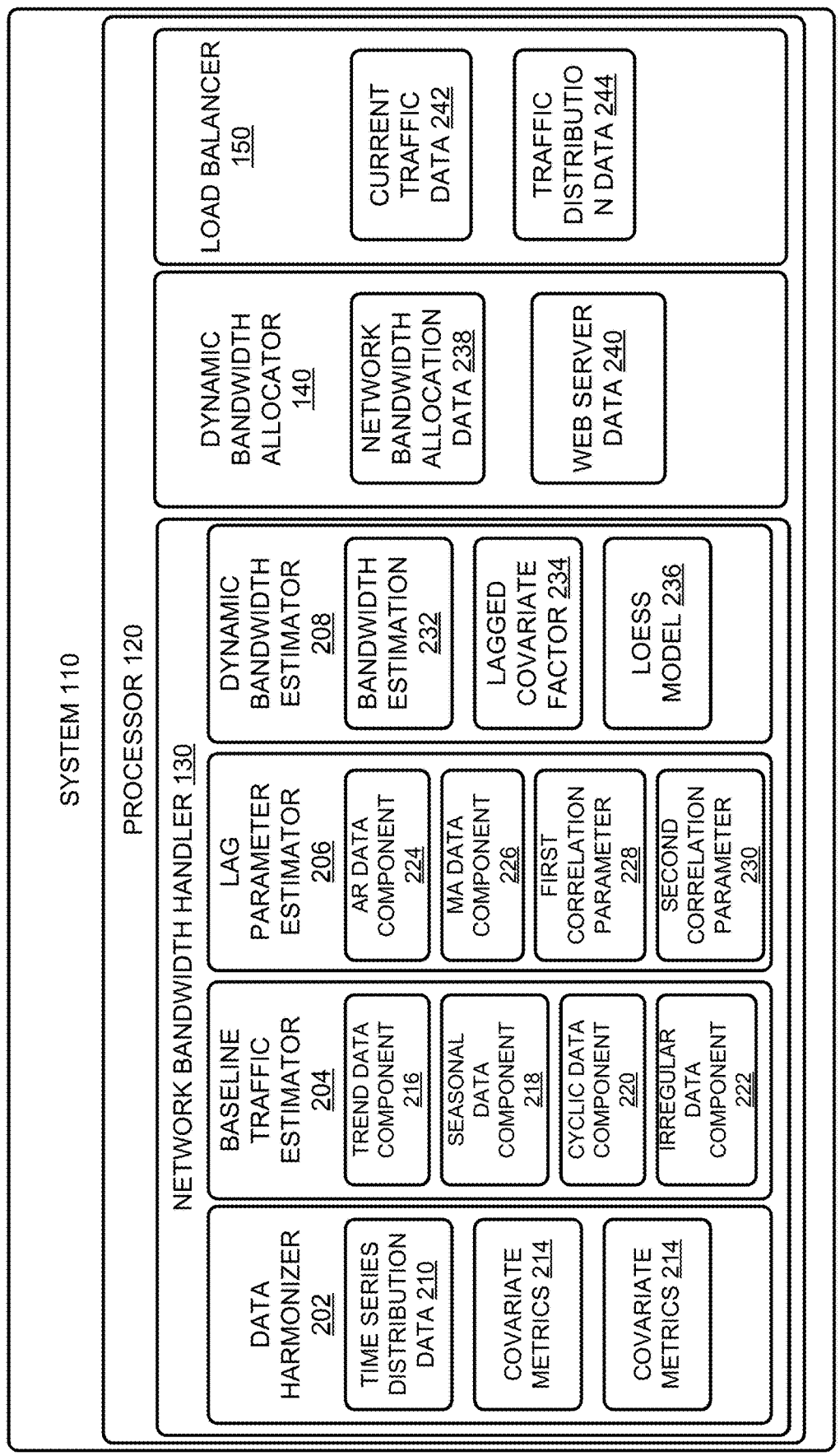
FIG. 2 illustrates various components of a system for network bandwidth management, according to an example embodiment of the present disclosure.

FIG. 2 illustrates various components of the system 100 for network bandwidth management, according to an example implementation of the present disclosure. The system 100 may include the processor 120. The processor 120 may be coupled to the network bandwidth handler 130, the dynamic bandwidth allocator 140, and the load balancer 150. The network bandwidth handler may include one or more components that may perform one or more operations for handling network bandwidth management for the server. For instance, the network bandwidth handler 130 may include, for example, but not limited to, four units for (a) analyzing and processing historical network traffic data, (b) predicting an estimate of network traffic in future, and (c) providing an estimated bandwidth for the server. The network bandwidth handler 130 may include a data harmonizer 202, a baseline traffic estimator 204, a lag parameter estimator 206, and a dynamic bandwidth estimator 208.

Figure 5:
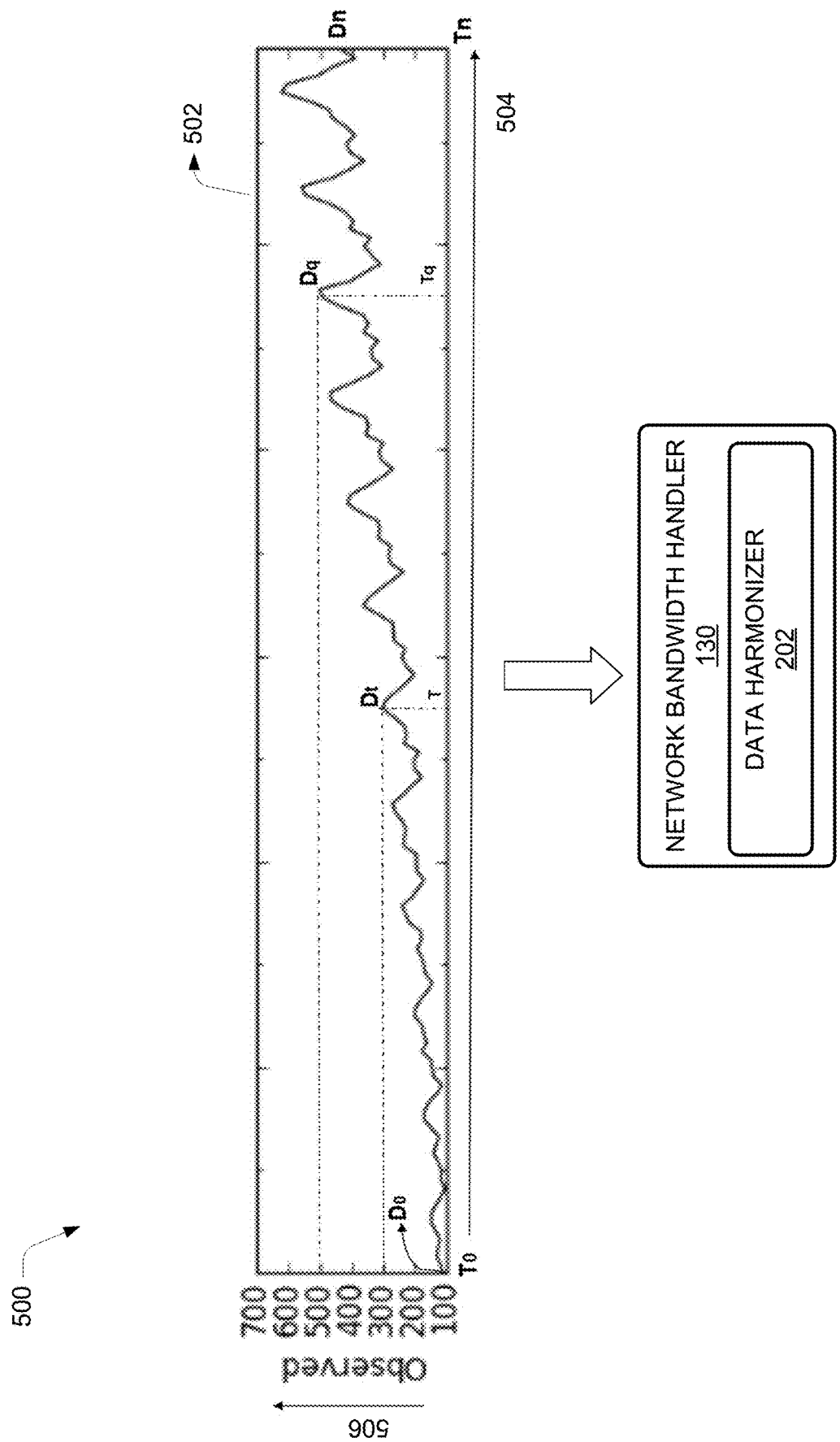
FIG. 5 illustrates a pictorial representation of collection of a time series distribution data by a data harmonizer, according to an example embodiment of the present disclosure.

The data harmonizer 202 may access a time series distribution data 210. The time series distribution data 210 may include data points distributed over a pre-defined time period 212. The data points may correspond to data values indicating an average count of network packets directed at the server during the pre-defined time period 212. The data harmonizer 202 may access the time series distribution data 210 in a defined format. For instance, the data harmonizer 202 may access the time series distribution data 210 in a chronological order. FIG. 5 illustrates a pictorial representation of an example of the time series distribution data 210 that may be accessed by the data harmonizer 202 over the pre-defined time period 212. The time series distribution data 210 may represent a sequence of average count of network packets i.e. data points recorded at successive equally spaced time points of the pre-defined time period 212. In other words, according to an example, the time series distribution data 210 may correspond to a sequence of discrete-time data of historic instances of web traffic or network packets.

The pre-defined time period 212 may be a user defined time period. For example, a user may provide an input of a duration or range comprising a starting time and an ending time. Accordingly, the data harmonizer 202 may access the time series distribution data 210 for the user defined time period. The time series distribution data 210 may represent a chronological representation of historical data of network traffic directed at the server. For example, the time series distribution data 210 may represent data points that may be aggregated thrice for each day i.e. Morning, Afternoon, and Evening. In one example, the time series distribution data 210 may represent historical data of network traffic at the server for past two years, and the data points indicating the average count of network packets would be distributed across 2190 instances of time i.e. 365*2*3.

Figure 4:
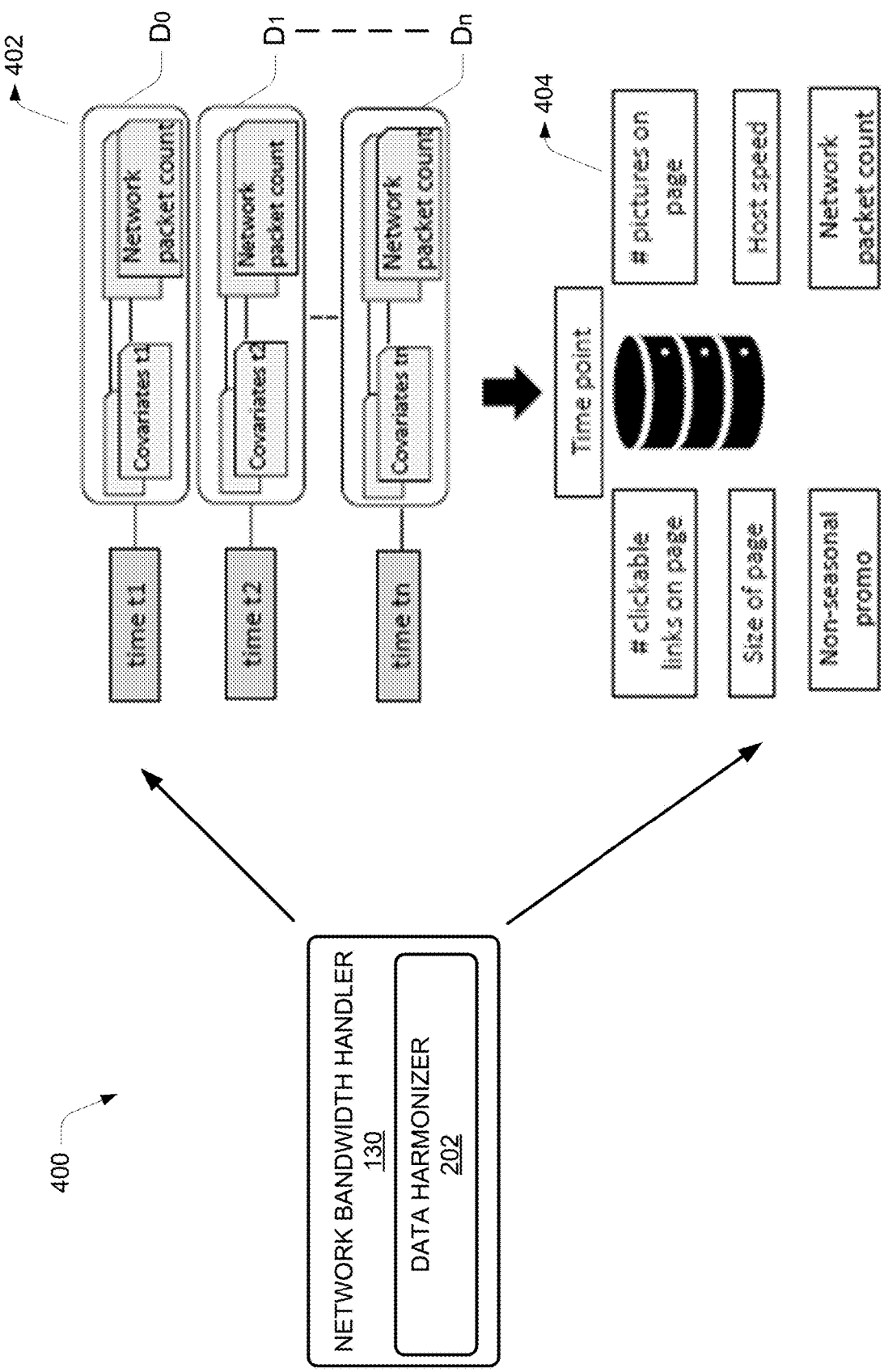
FIG. 4 illustrates a pictorial representation of data harmonization by a data harmonizer deployed by a network bandwidth handler of a system for network bandwidth management, according to an example embodiment of the present disclosure.

The data harmonizer 202 may collect the time series distribution data 210 that may include the distribution of data points representing portions of network traffic that may have been developed due to various external factors. For example, network traffic at a server hosting an e-commerce website may be affected due to various factors for example, but not limited to, a trending fashion or trending items, seasonal phases like festivals, wedding seasons, cyclical business rules like end of year sale, etc. In an aspect, various portions of the time series distribution data 210, i.e. past network traffic, may correspond to segments of the time series data 210 that may be correlated to one or more of these factors. In other words, the covariate metrics 214 may represent factors applicable at pre-defined time intervals of the pre-defined time period 212 for each segment of the time series distribution data 210. Thus, in some examples, data accessed by the data harmonizer 202 may be flagged or correlated with respect to one or more factors of the covariate metrics 214. The covariate metrics 214 may be calculated by the network bandwidth handler 130 based on the identification of one or more external factors influencing the network traffic over the pre-defined time period. FIG. 4 provides further details on the time series distribution data 210 aggregation based on the covariate metrics 214.

In accordance with said example implementation of the present disclosure, the network bandwidth handler 130 may include the baseline traffic estimator 204. The baseline traffic estimator 204 may access the time series distribution data 210 from the data harmonizer 202. Furthermore, the baseline traffic estimator 204 may decompose the time series distribution data 210 into various data components. The baseline traffic estimator 204 may decompose the time series distribution data 210 to obtain a trend data component 216, a seasonal data component 218, a cyclical data component 220, and an irregular data component 222. In accordance with some examples, the data components viz. the trend data component 216, the seasonal data component 218, and the cyclic data component 220 may correspond to the explainable data components, as described earlier. Furthermore, these data components may be expressed as a stochastic process that include variables which may evolve over the pre-defined time period in a random manner. Following few paragraphs describes further details of each of these data components.

According to an example, the trend data component 216 may include the first set of data points that may be indicative of development or inherent trend of a first portion of the network traffic. The first portion may be indicative of part of the network traffic that may be explained in form of a linear trend or a non-linear trend. For instance, the trend data component 216 may include distribution of the first set of data points representing an overall increasing or a decreasing inherent trend of the network traffic developed over the pre-defined time period. FIGS. 6A, 6D, and 11 illustrates pictorial representation of examples of the trend data component 216. The baseline traffic estimator 204 may identify the trend data component 216 from the time series distribution data 210 using a random walk model, details of which are further described in reference to FIGS. 6A-6D and 11.

According to an example, the seasonal data component 218 identified by the baseline traffic estimator 204 may be indicative of a second portion of the network traffic developed over the pre-defined time period 212 due to a seasonal factor. The seasonal data component 218 may include a distribution of second set of data points collected over the pre-defined time period. Data points of the second set of data points may represent such portions of the network traffic which may be developed in past due to a recurring event or a persistent or periodic change in usual events or a pattern of the network traffic. For example, the seasonal data component may represent portion of the network traffic at an e-commerce website hosted by the server that may be developed due to a festival offer e.g. Black Friday sale or New Year sale, or end of season sale or any other promotional offer, running during the pre-defined time period 212. In some examples, the baseline traffic estimator 204 may identify the seasonal data component 218 based on deterministic seasonal trigonometric model, details of which are described further in reference to FIGS. 2-21.

The cyclical data component 220 identified by the baseline traffic estimator 204 may be indicative of the third portion of the network traffic at the server that may developed due to a predefined operational rule. The pre-defined operational rule referred herein, may correspond to a business rule, as described earlier in reference to FIG. 1. The cyclic data component 220 may include a distribution of a third set of data points representative of the third portion of network traffic. For instance, in one example, the cyclic data component may correspond to the network traffic developed due to users visiting an online e-learning web portal hosted by the server, during start of an educational program or enrollment session of an e-learning module.

In accordance with some examples, the baseline traffic estimator 204 may obtain, from the time series distribution data 210, data components viz. the trend data component 216, the seasonal data component 218, the cyclic data component 220, and any other data component, that may be explained in terms of any pattern, behavior, or visible observation, from a previous history of network traffic or historical network traffic data i.e. the time series distribution data 210. Furthermore, the baseline traffic estimator 204 may also identify a residual data component, i.e. an irregular data component 222 that may be unexplained in terms of previous history of network traffic or historical network traffic data, as described earlier.

The irregular data component 222 may correspond to left over data components after splitting the explainable data components i.e. the trend data component 216, the seasonal data component 218, the cyclic data component 220, from the time series distribution data 210. The fourth set of data points of the irregular data component may be indicative of a fourth portion of the network traffic undefined or unexplained by definitive external factor i.e. trend, pattern, seasonal phase, or cyclic phase. FIGS. 6C, 6D, and 11 illustrates pictorial representations of examples of the irregular data component 222.

In accordance with said example implementation of the present disclosure, the baseline traffic estimator 204 may compute a baseline distribution traffic data. The baseline distribution traffic data may be indicative of an estimated baseline of distribution of the time series distribution data 210. The baseline traffic estimator 204 may compute the baseline distribution traffic data by forecasting an estimation of various sets of future data points corresponding to each of the trend data component 216, the seasonal data component 218, and the cyclical data component 220. In an example, the baseline distribution traffic data may be expressed as a function of the trend data component 216, the seasonal data component 218, and the cyclical data component 220. FIG. 11 illustrates a pictorial representation of an example of the baseline distribution traffic data computed by the baseline traffic estimator 204.

In accordance with said example implementation of the present disclosure, the lag parameter estimator 206 of the network bandwidth handler 130 may perform estimation of the irregular data component 222 i.e. the unexplained data component of the time series distribution data 210. The lag parameter estimator 206 may access the irregular data component 222 from the baseline traffic estimator 204. Furthermore, the lag parameter estimator 206 may transform the data points of the irregular data component 222 as a weak stationary stochastic process. The lag parameter estimator 206 may perform an evaluation to identify if one or more data points corresponding to the irregular data component 222 i.e. the fourth set of data points may be affected by its previous versions or any error versions of itself in past, details of which are described hereinafter.

The lag parameter estimator 206 may determine an auto regression (AR) data component 224 and a moving average data component 226, from the irregular data component 222. The AR data component 224 may include a distribution of a fifth set of data points. The fifth set of data points may be indicative of regression of the fourth set of data points of the irregular data component 222, over a first lag time interval. The first lag time interval for the AR data component 224 may be determined based on evaluation of a plot constructed using an auto-correlation function (ACF), by the lag parameter estimator 206, details of which are described later in the description. The ACF may be a function that may provide values of auto-correlation of a series, i.e., distribution of data points over a period of time with its lagged values. In other words, the auto-correlation function describes a relationship or a degree of relationship of present data values, i.e., data points with past data values, i.e. past data points. Furthermore, the moving average data component 226 may include a distribution of sixth set of data points. The sixth set of data points may be indicative of regression of error values of the fourth set of data points of the irregular data component 222, over a second lag time interval. The second lag time interval for the moving average data component 226 may be determined based on evaluation of a plot constructed using a partial auto-correlation function (PACF), details of which are described later in the description. The PACF may be a function that may provide values of partial-correlation of a series, i.e., a distribution of error versions of data points over a period of time with its lagged values.

The lag parameter estimator 206 may identify the AR data component 224 to recognize a correlation between two data points of the fourth set of data points at two different instances of time separated by a lag interval. Said differently, by determining the AR data component 224, the lag parameter estimator 206, provides a correlation between a first data point of the fourth set of data points with a second data point of the fourth set of data point. The second data point corresponds to a data value that may be recorded subsequent to a lag time, i.e. after a time instance on which the first data point may be recorded. Accordingly, in one example, the lag parameter estimator 206 may identify all such data points from the irregular data component 222 that may be correlated with prior versions of itself.

Figure 7:
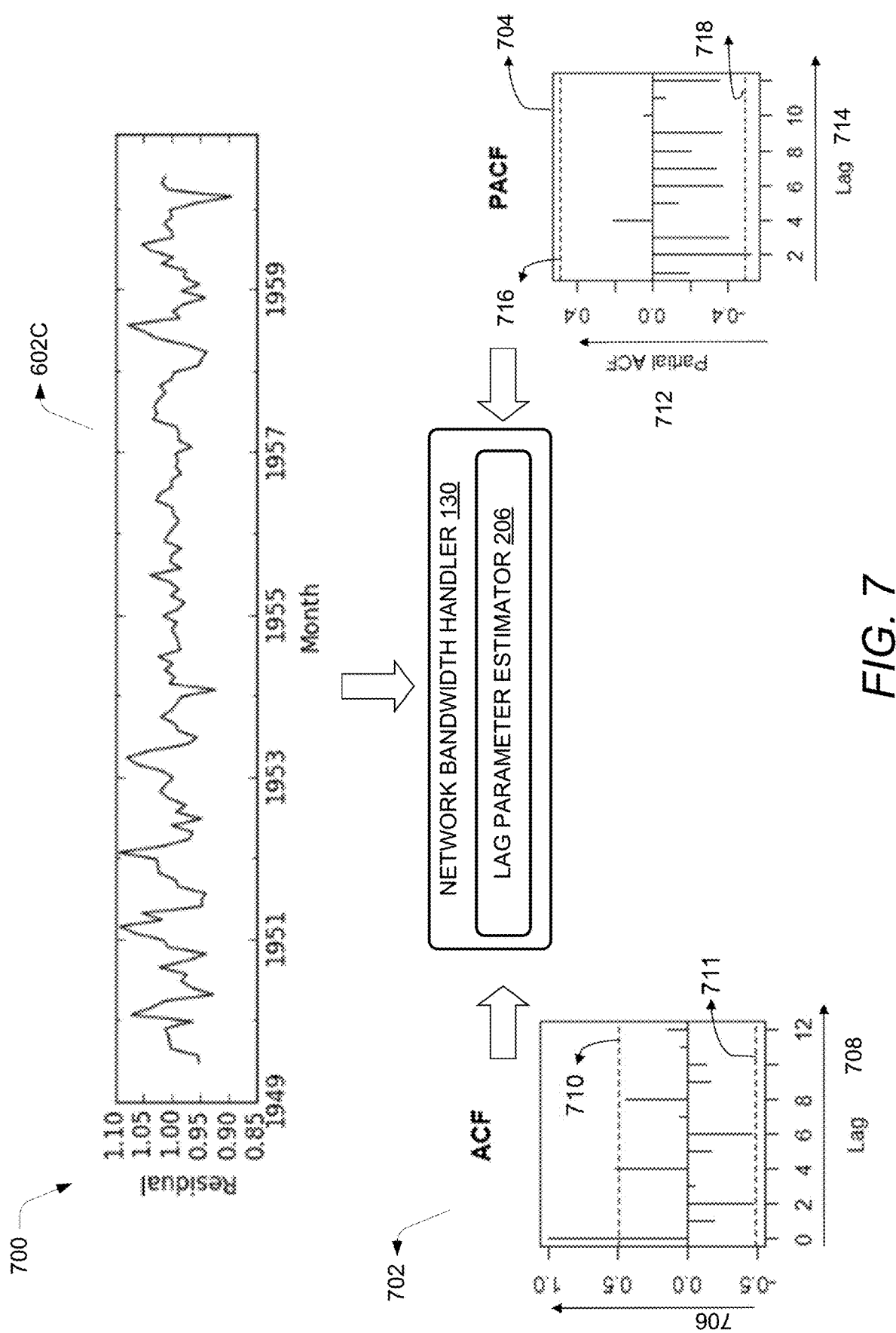
FIG. 7 illustrates a pictorial representation of computation of an auto regression data component and a moving average data component from an irregular data component by a lag parameter estimator of a network bandwidth handler, according to an example embodiment of the present disclosure.
Figure 12:
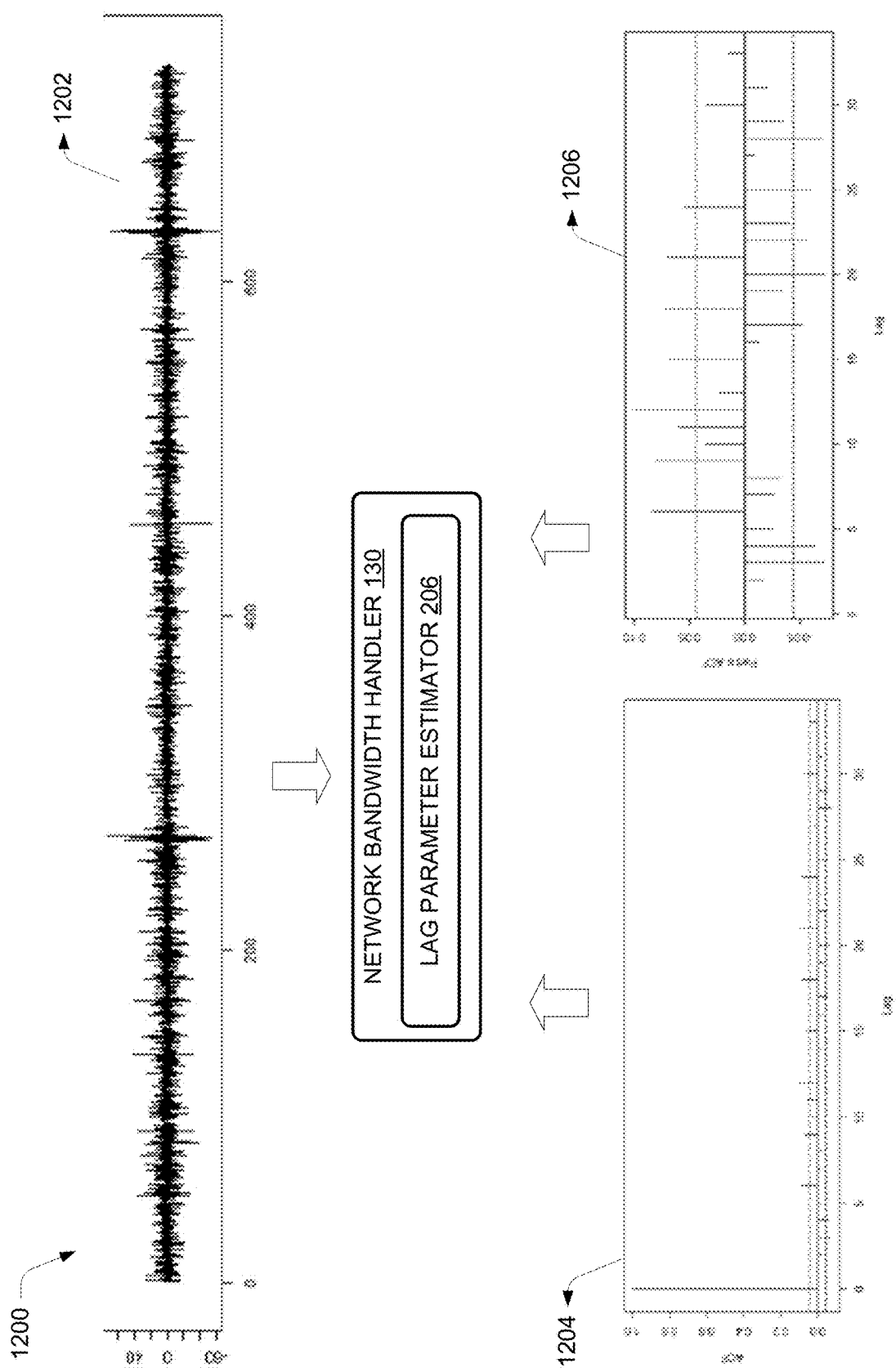
FIG. 12 illustrates a pictorial representation of computation of an auto regression data component and a moving average data component from an irregular data component by a lag parameter estimator of a network bandwidth handler, in an example use case, according to an example embodiment of the present disclosure.

The lag parameter estimator 206 may establish that the second data point may be correlated with the first data point recorded at a previous instance of time, if the correlation between the two data points, exceeds a pre-defined threshold for example, a confidence threshold, details of which are further described in reference to FIGS. 7 and 12. Furthermore, the lag parameter estimator 206 may collate all such data points and respective time instances of recording of such data points as the fifth set of data points corresponding to the AR data component 224. In this manner, by the identification of the AR data component 224, the lag parameter estimator 206, may enable that some data points corresponding to the unexplainable part of the time series distribution data 210 may be explained as an evolving variable of interest i.e. data points regressed upon its own lagged or prior values. Furthermore, the lag parameter estimator 206 may estimate future values of such data points that may be considered for future network traffic forecasting by the network bandwidth handler 130.

The lag parameter estimator 206 may identify the moving average data component 226 to recognize a correlation between error versions of two data points of the fourth set of data points at two different instances of time. For instance, based on determination of the moving average component the lag parameter estimator 206, may provide a correlation between a third data point representative of an error value of the fourth set of data points with a fourth data point representative of another error value of the fourth set of data point. The fourth data point corresponds to a data value that may be recorded subsequent to a lag time, i.e. after a time instance on which the second data point may be recorded. Accordingly, the lag parameter estimator 206 may identify all such data points representing error versions of data values that may be correlated with prior error versions of itself.

In an example, similar to as described for the AR data component 224, the lag parameter estimator 206 may establish that the fourth data point may be correlated with the third data point recorded at a previous instance of time, if the correlation between the two data points, exceeds a pre-defined threshold for example, a confidence threshold, details of which are further described in reference to FIGS. 7 and 12. Furthermore, the lag parameter estimator 206 may collate all such data points representing error versions of values at lagged time intervals and respective time instances of recording of such data points as the sixth set of data points corresponding to the AR data component 224. Furthermore, the lag parameter estimator 206 may estimate future error versions of data values that may be considered for future network traffic forecasting by the network bandwidth handler 130.

In accordance with said example implementation, to determine the AR data component 224 and the moving average data component 226, the lag parameter estimator 206, may compute a first correlation parameter 228 and a second correlation parameter 230, respectively. Furthermore, to estimate future data points i.e. data points for future time point corresponding to the irregular data component 222, the lag parameter estimator 206 may use the first correlation parameter 228 and the second correlation parameter 230, details of which are described in following paragraph.

The lag parameter estimator 206 may construct, using the ACF, a first plot representing a distribution of correlation values between data points distributed over lagged time intervals. The first plot may include at least a first correlation value indicative of a first correlation between a part of network traffic at a first time instance and another part of the network traffic at a second time instance subsequent to the first time instance. FIG. 7 illustrates an example of pictorial representation of a first plot 702 constructed by the lag parameter estimator 206.

The lag parameter estimator 206 may construct, using the PACF, a second plot representing a distribution of correlation between error versions of data points over lagged time intervals. The second plot may include at least a second correlation value indicative of a second correlation between an error version of data point associated with a part of the network traffic at a third time instance and the error version of another data point associated another part of the network traffic at a fourth time instance. The fourth time instance may be subsequent to the third time instance. FIG. 7 also illustrates an example of pictorial representation of a second plot 704 constructed by the lag parameter estimator 206.

Furthermore, the lag parameter estimator 206 may determine, a first correlation parameter (P) 228 based on the first correlation value of the first plot and a first confidence threshold. Furthermore, the lag parameter estimator 206 may determine, a second correlation parameter (Q) 230 based on evaluation of the second correlation value of the second plot against a second confidence threshold. In accordance with various examples described herein, the first confidence threshold and the second confidence threshold may be pre-defined. In an example, these thresholds may be defined based on correlation series for different lagged values. For instance, a user may define these thresholds based on correlation trends present in the time series distribution data. Further, a factor that may influence these threshold may be auto-correlation itself. In an instance, the first confidence threshold and the second confidence threshold may be for example 95%. In another instance, the first confidence threshold and the second confidence threshold may be for example 90% and 85% respectively.

In accordance with an example, the first confidence threshold may be indicative of a threshold value beyond which any correlation value between two data points identified on the first plot may be considered as a high correlation. In other words, if the first correlation value on Y axis in the first plot is identified to be greater than or equal to the first confidence threshold, the lag parameter estimator 206 may record a high correlation existing between two data points at a corresponding lag of the time interval on X axis. Accordingly, if the first correlation value on Y axis in the first plot is identified to be lesser than the first confidence threshold, the lag parameter estimator 206 may record a low correlation existing between two data points at a corresponding lag of the time interval on X axis. Similarly, the second confidence threshold may be indicative of a threshold value beyond which any correlation value between error versions of two data points identified on the second plot can be considered as a high correlation. In other words, if the second correlation value on Y axis in the second plot is identified to be greater than or equal to the second confidence threshold, the lag parameter estimator 206 may record a high correlation existing between error versions of two data points at a corresponding lag of the time interval on X axis. Accordingly, if the second correlation value on Y axis in the first plot is identified to be lesser than the second confidence threshold, the lag parameter estimator 206 may record a low correlation existing between error versions of two data points at a corresponding lag of the time interval on X axis.

In accordance with said example implementation, the lag parameter estimator 206 may compute, the AR data component 224 based on the first correlation parameter (P) 228 for a future time instance and may compute the moving average data component 226 for the future time instance based on the second correlation parameter (Q) 230. Furthermore, a lagged covariate factor 234 may be determined based on the AR data component and the moving average data component 226. Further details of the AR data component 224, the moving average data component 226, the first correlation parameter 228, and the second correlation data parameter 230 are described in reference to FIGS. 7 and 12.

Moving to the dynamic bandwidth estimator 208 component of the system 100, in accordance with an example implementation of the present disclosure, the network bandwidth handler 130 may include the dynamic bandwidth estimator 208 to predict estimated network traffic for future time point. Furthermore, based on the estimated network traffic, the network bandwidth handler 130 may provide a bandwidth estimation 232 for the server. To determine the estimated bandwidth 232, the dynamic bandwidth estimator 208 may utilize a LOESS i.e. a locally weighted scatter plot smoother model 236 for predicting the estimated network traffic in future time point, details of which are described in following paragraph.

The dynamic bandwidth estimator 208 may determine an estimated network traffic for a future time point based on multiple inputs. For instance, the estimated network traffic for the future time point may be determined based on (a) the baseline distribution traffic data, which is a combination of trend data component 216, seasonal data component 218, and cyclical data component 220 (b) a lagged covariate factor 234, and (c) the covariate metrics 214. The lagged covariate factor 234 may be computed by the dynamic bandwidth estimator 208 based on the AR data component 224 and/or the moving average data component 226 itself. The dynamic bandwidth estimator 208 may provide, the baseline distribution traffic data, the lagged covariate factor 234, and the covariate metrics 214 as inputs to the LOESS model 236. Furthermore, based on output of the LOESS model 236, the dynamic bandwidth estimator 208 may determine the estimated network traffic for the future time point. Furthermore, the dynamic bandwidth estimator 208 may provide the bandwidth estimation 232 for the future time for the server based on the estimated network traffic for the future time point, details of which are further described in reference to FIGS. 3-21.

The dynamic bandwidth allocator 140 may allocate network bandwidth to the server. The dynamic bandwidth allocator 140 may allocate the network bandwidth dynamically to the server based on one or more factors and in different manners, which are described hereinafter, by way of several examples. For instance, in one example, the dynamic bandwidth allocator 140 may allocate network bandwidth to the server based on a network bandwidth allocation data 238. The network bandwidth allocation data 238 may include, for example, details of current bandwidth allocation to the server, bandwidth allocation details for the server at various past time intervals, etc. In another example, the dynamic bandwidth allocator 140 may allocate network bandwidth to the server based on other parameters like web server data 240 that may include data related to current network traffic or web demand. In another example, the dynamic bandwidth allocator 140 may allocate the network bandwidth to the server based on the estimated network bandwidth i.e. forecasted bandwidth accessed from the network bandwidth handler 130. Furthermore, in some examples, the dynamic bandwidth allocator 140 may allocate the network bandwidth to the server based on the bandwidth estimation 232 along with other factors, for example, but not limited to, size of web pages, computational capability of the server, type of content developing the network traffic, priority associated with the network traffic or web demand, buffer bandwidth value, etc. The bandwidth allocation for the server, may be defined as a function of size of web pages hosted by the server, the estimated network traffic, and a buffer value. Accordingly, the dynamic bandwidth allocator 140 may compute the bandwidth and allocate it to the server. In another example, the dynamic bandwidth allocator 140 may allocate network bandwidth to the server based on network traffic data pre-stored as the web server data 240 applicable for the server and/or the bandwidth estimation 232 for the future time point.

Moving to the load balancer 150 component of the system 100, according to an example, the load balancer 150 may perform load balancing of the network traffic at the server. The load balancer 150 may monitor a current network traffic at the server. Furthermore, the load balancer 150 may store data values of network traffic that may have been observed in recent time intervals. For instance, the load balancer 150 may store details corresponding to the network packets that may have been transacted at the server in recent past i.e. in a time period which may relatively far smaller than the pre-defined time period 212. The load balancer 150 may store such data values as current traffic data 242. The load balancer 150 may store network traffic experienced in any pre-defined range of time period or user defined range of past time instances, as current traffic data 242, and may use it for load balancing the network traffic at the server. The load balancer may analyze the current traffic data 242 and perform load balancing of the network traffic at the server based on one or more pre-defined rules. For instance, in one example, the load balancer 150 may analyze the current traffic data 242 to identify if the bandwidth allocated to the server is insufficient to support the current network traffic. Based on the identification, the load balancer 150 may perform load balancing of the network traffic at the server. In some examples, the load balancer 150 may perform a comparison of the allocated bandwidth to the server against a desired bandwidth based on the current traffic data 242. Accordingly, the load balancer 150 may perform the load balancing, if the allocated bandwidth is determined to be less than the desired bandwidth. In some examples, the load balancing by the load balancer 150 may involve distributing the current network traffic to several host servers based on pre-defined rules. The details pertaining to distribution of the network traffic performed by the load balancer 150 may be stored as traffic distribution data 244 and may be reused by the load balancer 150 on a future time instance. Said differently, the load balancer 150 may access the traffic distribution data 244 and may re-use a previously used traffic distribution schema stored in the traffic distribution data 244 for performing load balancing during a subsequent time instance.

Figure 3:
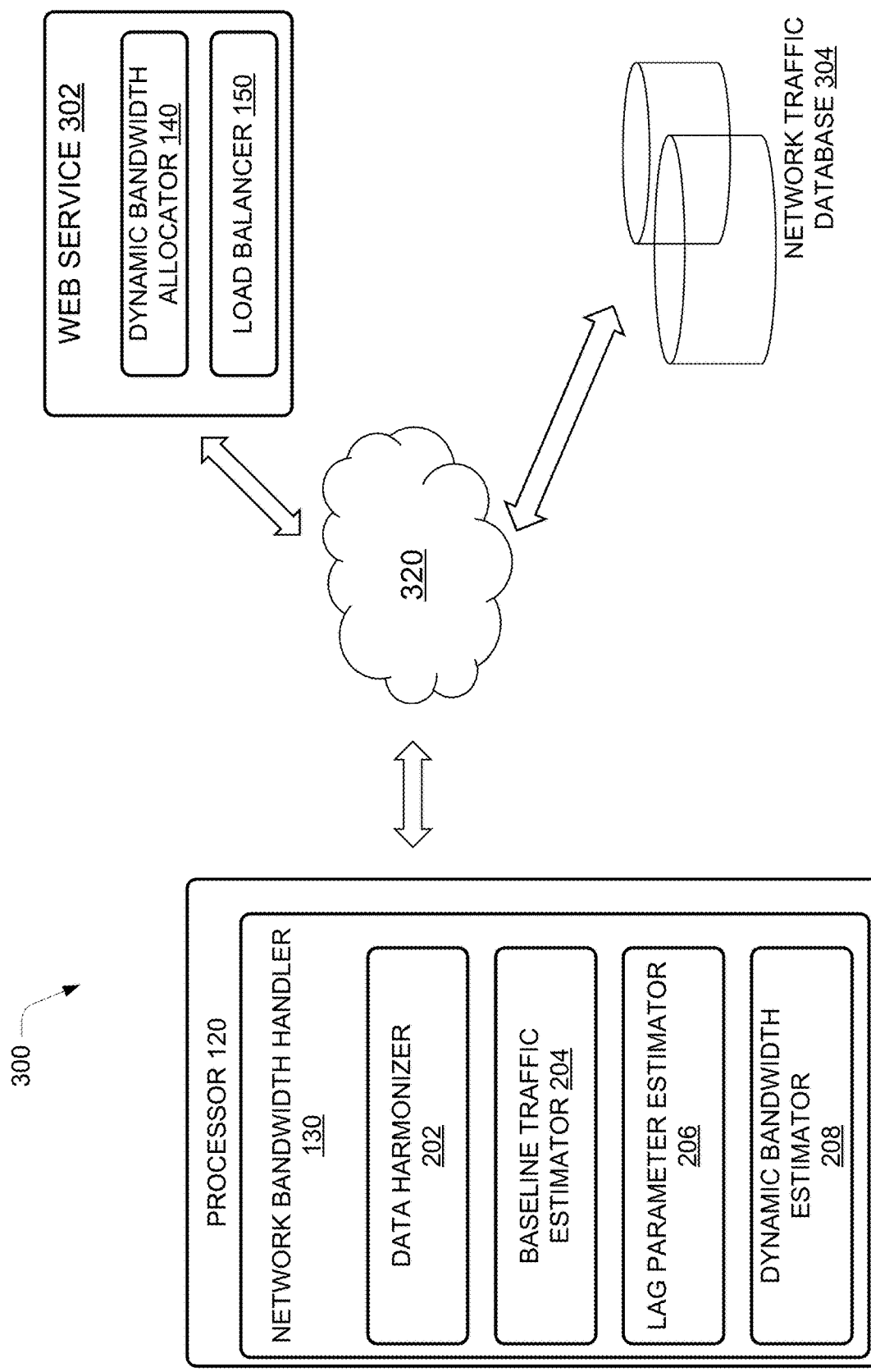
FIG. 3 illustrates various components of a system comprising a network bandwidth handler, a dynamic bandwidth allocator, and a load balancer used for network bandwidth management, according to another example embodiment of the present disclosure.

FIG. 3 illustrates various components of a system comprising the network bandwidth handler 130, the dynamic bandwidth allocator 140, and the load balancer 150 used for network bandwidth management, according to another example implementation of the present disclosure. Illustratively, a web service 302 may comprise the dynamic bandwidth allocator 140 and the load balancer 150 of the system 100, as described in FIGS. 1 and 2. The web service 302 may correspond to a cloud component, for example, a cloud based service or a cloud based infrastructure, or a cloud based platform. The network bandwidth handler 130 may be communicatively coupled to the web service 302 via a communication network 320. Furthermore, the network bandwidth handler 130 and the web service 302 may also be communicatively coupled to a network traffic database 304 via the communication network 320. The network traffic database 304 may store network traffic data at the plurality of servers during the pre-defined time period 212.

The communication network 320 may be a cellular network, a broadband network, a telephonic network, an open network, such as the Internet, or a private network, such as an intranet and/or the extranet, or any combination thereof. In other examples, the communication network 320 can be any collection of distinct networks operating wholly or partially in conjunction to provide connectivity between the system 100, one or more servers, and/or the data source(s). Furthermore, the communication network 320 may include and/or support one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and may be further enabled with technologies such as, by way of example, Global System for Mobile Communications (GSM), Personal Communications Service (PCS), Bluetooth, WiFi, Fixed Wireless Data, 2G, 2.5G, 3G, 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 14:
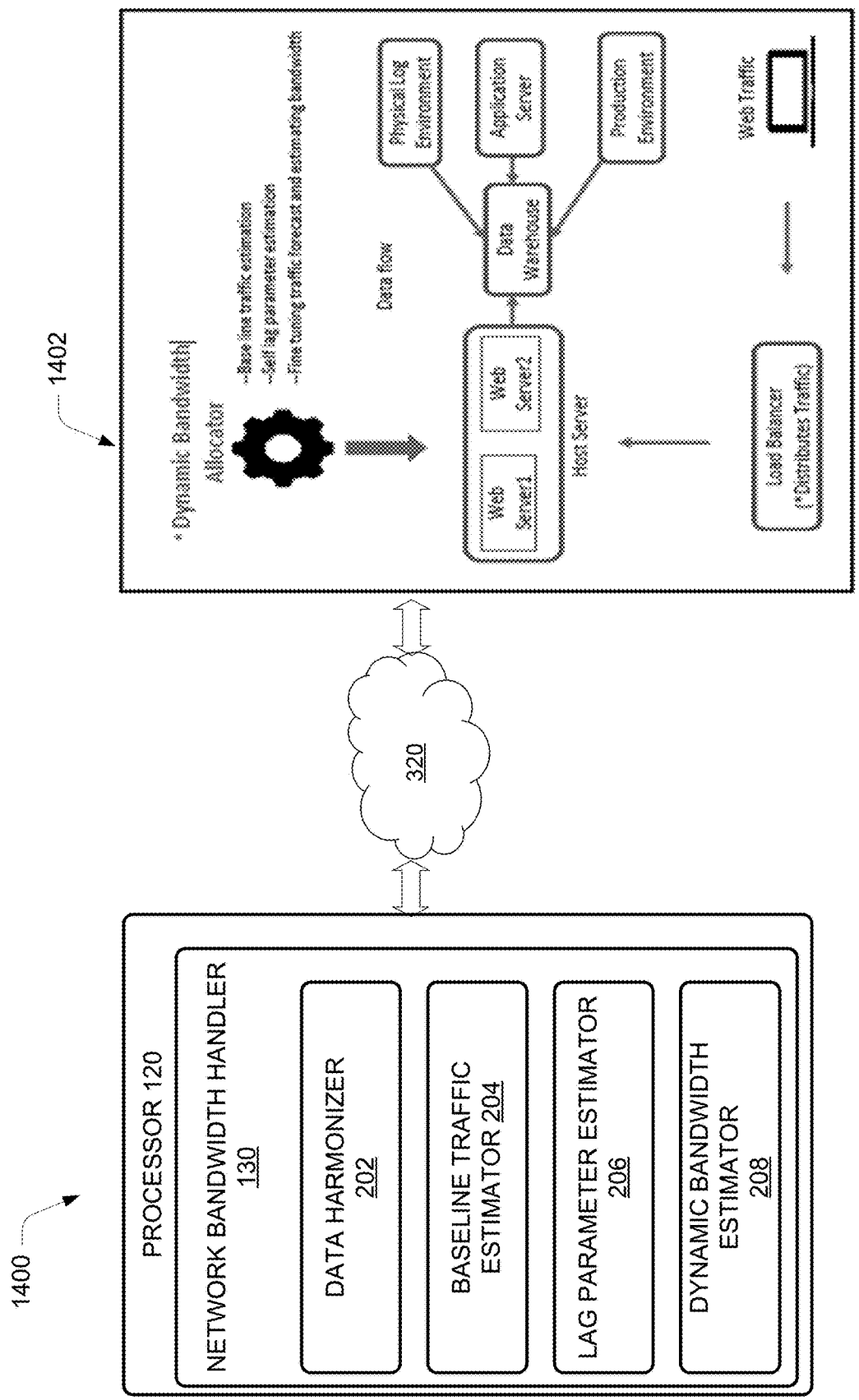
FIG. 14 illustrates a pictorial representation of dynamic bandwidth allocation based on a bandwidth estimation, by a dynamic bandwidth allocator, according to an example embodiment of the present disclosure.

The web service 302 may be coupled to a plurality of servers. The load balancer 150 of the web service 302 may monitor network traffic at the plurality of servers and perform load balancing of the network traffic at the plurality of servers, in a manner as described earlier in reference to FIGS. 1 and 2. Furthermore, the web service 302 may access historical network traffic data from the network traffic database 304 via the communication network 320. The dynamic bandwidth allocator 140 may use the network traffic data accessed from the network traffic database 304 and forecasted network traffic accessed from the network bandwidth handler 130, to compute a network bandwidth to be allocated to a server. The dynamic bandwidth allocator 140 may accordingly allocate the network bandwidth to the server. FIG. 14 illustrates a pictorial representation of an example of dynamic bandwidth allocation based on a bandwidth estimation, by a dynamic bandwidth allocator.

FIG. 4 illustrates a pictorial representation 400 of data harmonization by the data harmonizer 202, according to an example implementation of the present disclosure. The data harmonizer 202 may be deployed by the network bandwidth handler 130 of the system 100 for network bandwidth management. As illustrated in a first view 402 of the FIG. 4, the data harmonizer 202 may access the time series distribution data 210. Illustratively, the time series distribution data 210 may include data points ($D_0$-Dn) collected over a time period ($T_1$-Tn). As described earlier in reference to FIGS. 1 and 2, the data points ($D_0$-Dn) may represent an average count of network packets corresponding to network traffic that may be directed at a server at respective time instances of the time period ($T_1$-Tn). The time period ($T_1$-Tn) may correspond to the pre-defined time period 212 e.g. a user defined time period. The data harmonizer 202 may access the time series distribution data 210 in a defined format. For example, the data harmonizer 202 may access the time series distribution data 210 in a chronological order of day part time morning, afternoon, and evening; These data points recorded at pre-defined time intervals may be arranged in a sequential order represented as a series of data values spread over the pre-defined time period.

The data points $D_0$-Dn may be correlated with one or more external factors i.e. the covariate metrics 214, as described earlier. Illustratively, the data points $D_0$-Dn of the time series distribution data 210 may be correlated with covariates (Covariates t1, Covariates t2, . . . Covariates Tn) relevant at respective time instances ($T_1$-Tn). For example, $D_0$ represents a data value indicating an average count of network packets developed due to covariates at time $T_1$. Similarly, Dn represents a data value indicating an average count of network packets developed due to covariates at time $T_n$. As described earlier in reference to FIGS. 1 and 2, one or more segments of the time series distribution data 210 may represent a distribution of various portions of network traffic which may have been developed due to various external factors. Said differently, each of the segments of the time series distribution data 210 may be correlated to one or more of these external factors. Various portions of the network traffic at the server may be impacted by the external factors, also referred herein as the covariate metrics 214, influencing development of the network traffic or its any portion thereof at the server. The covariate metrics 214 for the time series distribution data 210 illustrated in the view 402, may be, clickable links on a web page of a web site hosted by the server, images on the web page, audio or video content on the web page, size of the web page, non-seasonal promotional offer on the web page, computational capability or speed of the server hosting the web page, etc.

Accordingly, the data harmonizer 202 may access the time series distribution data 210 including average count of network packets based on the covariate metrics 214 predominantly applicable at respective time instances ($T_1$-Tn). Also, each data point of the distribution of data points in the time series distribution data 210 may be identified or flagged with one or more of the covariate metrics 214, to which it may be correlated. As an example, referring to the first view 402, the data point D0 is associated with covariates at time instance $T_1$. Similarly, the data point Dn is associated with covariates at time instance Tn, and so on. A second view 404 of the FIG. 4 illustrates various external factors or the covariate metrics 214 influencing the development of the network traffic corresponding to various portions of the time series distribution data 210.

FIG. 5 illustrates a pictorial representation 500 of collection of the time series distribution data 210 by the data harmonizer 202, according to an example implementation of the present disclosure. The data harmonizer 202 may access the time series distribution data 210 in form of a plot i.e. a graph representing a data set. For example, as illustrated in FIG. 5, the data harmonizer 202 may access a plot 502 as an input. The plot 502, as illustrated in FIG. 5, shows the distribution of data points ($D_0$-Dn) distributed over the pre-defined time period ranging from time instance $T_0$ to time instance Tn. Illustratively, value of each data point is represented on Y axis 506 and time instance is represented on X axis 504. As an example, Dt represents value of data point i.e. average count of network packets at time instance t. Time period between time instance $T_0$ to time instance Tn, as illustrated in the plot 502 may be a user defined time period. For example, a user may provide an input of a duration or range comprising a starting time $T_0$ and an ending time Tn, for which the time series distribution data 210 may be accessed by the data harmonizer 202. Accordingly, the data harmonizer 202 may access the time series distribution data 210 during the user defined time period.

Moving to FIG. 6A, a pictorial representation of an example of the trend data component 216 of the time series distribution data 210 is illustrated. The trend data component 216 may be obtained by the baseline traffic estimator 204, according to an example embodiment of the present disclosure. According to an example, the baseline traffic estimator 204 may access the time series distribution data 210. Furthermore, the baseline traffic estimator 204 may decompose the time series distribution data 210 into one or more data components where each data component may be defined as a stochastic process. Accordingly, the baseline traffic estimator 204 may obtain the trend data component 216 from the time series distribution data 210. Furthermore, the baseline traffic estimator 204 may also obtain other data components like the seasonal data component 218, the cyclic data component 220, and the irregular data component 222, details of which are described in FIG. 6B onwards.

FIG. 6A illustrates a plot 602A representing the trend data component 216 of the time series distribution data 210. The trend data component 216 illustrated in the plot 602A represents the distribution of the first set of data points corresponding to an average count of network packets collected over the pre-defined time period ($T_0$-Tn). The first set of data points represented on the plot 602A may be indicative of such data points of the time series distribution data 210 that may correspond to an inherent development of the network traffic, for example, in form of a linearly increasing trend 606A, over the pre-defined time period. Thus, the plot 602A of the trend component data 216 represents a portion of the network traffic represented in the plot 502 of the time series distribution data 210. Illustratively, value of each data point of the first set of data points i.e. corresponding to the trend data component 216 is represented on Y axis 604A and its corresponding time instance i.e. time instance of recording that data point is represented on X axis 504.

The baseline traffic estimator 204 may obtain the trend data component 216, as illustrated in the plot 602A, by using a random walk model. In a random walk model, for each time instance within the pre-defined time period 212, a variable may take a random step away from its previous value. The random walk model used for obtaining the trend data component 216 from the time series data component 210 may be represented using an equation:

$$M(t)=M(t-1)+Z'(t)$$

Here, M (t) represents a data point of the first set of data points, i.e. an average count of network packets corresponding to portion of network traffic that contributes for increasing inherent trend, recorded at time instance t. It may be understood from the above equation that trend at time t is affected by its previous instance t−1. In other words, the above equation represents a monotonically increasing trend in the development of a variable i.e. the network traffic. Furthermore, Z' (t) corresponds to the random step at time instance t, by which the value of the variable in a next time instance shifts from its previous value. The random step may be a constant value or may vary at different time instances. Thus, each data point of the first set of data points for the pre-defined time period 212 and for any future time instance can be computed by the baseline traffic estimator 204 using the equation, as described above.

FIG. 6B illustrates a pictorial representation of an example of the seasonal data component 218 of the time series distribution data 210, obtained by the baseline traffic estimator 204. The baseline traffic estimator 204 may access the time series distribution data 210. Furthermore, the baseline traffic estimator 204 may decompose the time series distribution data 210 to obtain the seasonal data component 218 from the time series distribution data 210. FIG. 6B illustrates a plot 602B representing the seasonal data component 218 of the time series distribution data 210. The seasonal data component 218 as illustrated in the plot 602B represents the distribution of the second set of data points corresponding to an average count of network packets collected over the pre-defined time period ($T_0$-Tn).

The second set of data points represented on the plot 60BA may be indicative of such data points of the time series distribution data 210 that may correspond to recurring and persistent change in a pattern of the development of the network traffic at the server. For instance, in some examples, a web server hosting a website for online purchase of air-conditioners and air coolers may experience more visits by users during months of summers. Accordingly, network traffic on such website may be high during a season and low during another season. Thus, the plot 602B of the seasonal data component 218 represents that portion of network traffic of the time series distribution data 210 that may be affected due to seasonality or a recurring pattern. Illustratively, in the plot 602B, a value of each data point of the second set of data points i.e. corresponding to the seasonal data component 218 is represented on Y axis 604B, and its corresponding time instance i.e. time instance of recording that data point is represented on X axis 504. It may be observed that a recurring or persistent pattern indicating the seasonality or periodic characteristic of the seasonal data component 218 is noticeable in the plot 602B, after every Ta time interval.

The baseline traffic estimator 204 may obtain the seasonal data component 218, as illustrated in the plot 602B, by using a deterministic trigonometric seasonal model. Using trigonometric seasonal model involves use of trigonometric functions. The trigonometric functions inherently includes seasonal or repeating pattern like structure, thereby, effectively capturing fluctuations in the data points of the time series distribution data 210 that may be impacted due to seasonal characteristics. In an example, the trigonometric seasonal model used for obtaining the trend data component 216 from the time series distribution data 210 may be represented using the equation below:

$$y(i) = W(0) + W(1)t(i) + W(2)\sin\frac{2\pi t(i)}{P} - \emptyset) + \epsilon(i)$$

In the above equation, W(0) and W(1) T(i) may represent a linear trend component, sin [( 2πt(i)/P−ø)+ϵ(i)]] may present a seasonality component, P represents a time period for which the seasonality reoccurs, i.e. duration after which seasonal pattern may be repeated, 'ø' represents an unknown phase/shift parameter, which may impact the time period P, and 'I' represents an instance of time. Thus, each data point of the second set of data points for the pre-defined time period 212 and for any future time instance can be computed by the baseline traffic estimator 204 using the equation, as described above.

FIG. 6C illustrates a pictorial representation of an example of the irregular data component 222 obtained from the time series distribution data 210 by the baseline traffic estimator 204, according to an example embodiment of the present disclosure. A plot 602C representing the irregular data component 222 of the time series distribution data 210 is illustrated. The plot 602C may represent a distribution of the fourth set of data points, i.e. the data points which may be left over after removing the trend data component 216, the seasonal data component 218, and the cyclic data component 222 from the time series distribution data 210. The distribution of the fourth set of data points, as illustrated in the plot 602, may be representative of portions of the network traffic at the server that may be unexplained or undefined by definitive external factor i.e. trend, pattern, seasonal phase, or cyclic phase.

FIG. 6D illustrates a pictorial representation 600D of an example of decomposition of the time series distribution data 210, by the baseline traffic estimator 204, to obtain the trend data component 216, the seasonal data component 218, and the irregular data component 222 as described in reference to FIGS. 6A-6C. As illustrated in the pictorial representation 600D, the time series distribution data 210, represented by the plot 502, may be split into the trend data component 216, represented by the plot 602A, the seasonal data component 218 (represented by the plot 602B), and the irregular data component 222, represented by the plot 602C, based on techniques as described earlier in reference to FIGS. 6A-6C.

FIG. 7 illustrates a pictorial representation of an example of computation of the AR data component 224 and the moving average data component 226, by the lag parameter estimator 206, according to an example embodiment of the present disclosure. As described earlier in reference to FIG. 2, the lag parameter estimator 206 may determine the AR data component 224 and the moving average data component 226 from the irregular data component 222. Illustratively, the lag parameter estimator 206 may access the plot 602C representing the distribution of the fourth set of data points corresponding to the irregular data component 222. Furthermore, the lag parameter estimator 206 may construct the first plot 702 and the second plot 704, in a similar manner, as described earlier in reference to FIG. 2. The lag parameter estimator 206 may evaluate the first plot 702 and the second plot 704 to determine the first correlation parameter (P) 228 and the second correlation parameter (Q) 230. The lag parameter estimator 206 may also compute the AR data component 224 and the moving average data component 226 using the first correlation parameter (P) 228 and the second correlation parameter (Q) 230. The lag parameter estimator 206 may use the first correlation parameter (P) 228 and the second correlation parameter (Q) 230, to estimate future data points i.e. data points for future time point corresponding to the irregular data component 222. The lag parameter estimator 206 may determine the fifth set of data points corresponding to the AR data component 224 and the sixth set of data points corresponding to the moving average data component 226. According to an example, the future data points identified in the fifth set of data points and the sixth set of data points may include such data points that may not have been captured in the baseline distribution traffic data computed by the baseline traffic estimator 204. In other words, these sets of data points correspond to estimation of unexplained portion of the network traffic, as described earlier.

Referring to the first plot 702 illustrated in FIG. 7, Y axis represents correlation values 706 and X axis represents lag intervals 708. The correlation values 706 represented on Y axis may be indicative of a correlation between two data points of the irregular data component 222 at a given lag time interval. For example, as illustrated in the plot 702, at lag time interval '0', the correlation value on Y axis is '1'. Furthermore, at lag time interval '2', the correlation value is '−0.5' and at lag time interval '6' the correlation value is '−0.5'. Based on the evaluation of the correlation values 706 of the first plot 702, the lag parameter estimator 206 may identify that at lag time interval '0' there exists high correlation between two data points i.e. data points from amongst the fourth set of data points of the irregular data component 222. Similarly, the lag parameter estimator 206 may identify that at lag time intervals '2' and '6' there exists low correlation between two data points i.e. data points from amongst the fourth set of data points of the irregular data component 222. In a similar manner, the lag parameter estimator 206 may identify if two data points, from amongst the fourth set of data points, are highly correlated, moderately correlated, or not correlated at all. However, for estimating future data points corresponding to the AR data component 224 of irregular data component 222, the lag parameter estimator, may only select lag interval values for the data points for which a correlation exceeds the first confidence threshold, as described earlier, in FIG. 2 and further described hereinafter.

The lag parameter estimator 206 may evaluate the first plot 702 to observe correlation values at various lag time intervals. For instance, the lag parameter estimator 702 may identify a correlation value of '1.0' at lag time interval '0'. The first correlation value may be indicative of a first correlation between a first data point y(t-lg) representing the network traffic at a first time instance (t-lg) and a second data point y (t) representing network traffic at a second time instance (t). The second time instance (t) may be a time instance occurring subsequently after a lag time interval 'lg' to the first time instance (t-lg). Here, 'lg' represents a lag time interval represented on X axis of the first plot 702.

Furthermore, the lag parameter estimator 206 may determine, the first correlation parameter (P) 228 based on comparison of the first correlation value and the first confidence threshold, as described earlier, in reference to FIG. 2. In accordance with various examples described herein, the first confidence threshold may correspond to pre-defined threshold value or may be a threshold value defined based on a user input. Illustratively, a horizontal line 710 along the X axis represents the first confidence threshold. The first confidence threshold may be indicative of a threshold value beyond which any correlation value between two data points identified on the first plot 702 can be considered as a high correlation. In other words, if the first correlation value on Y axis in the first plot is identified to be greater than or equal to the first confidence threshold, the lag parameter estimator 206 may record a high correlation existing between two data points at a corresponding lag of the time interval on X axis.

The lag parameter estimator 206 may evaluate the first plot 702 by comparing each correlation value at a respective lag interval against the first confidence threshold. Based on this comparison, the lag parameter may identify one or more lag intervals at which correlation between two data points is observed to be high i.e. correlation value is more than the first confidence threshold. For example, as illustrated in the first plot 702, the correlation value at lag time interval 0 and 4 exceeds the confidence threshold. Thus, the lag parameter estimator 206 may establish that there exists high correlation between two data points at a lag of '4'. Said differently, a first data point y (t) captured at point t may be highly correlated with the second data pointy (t+4) captured at point t+4. Accordingly, the lag parameter estimator 206 may use this information to determine the first correlation parameter (P) 228.

In accordance with various examples described herein, the first correlation parameter (P) represents a lag at which a regression happens at a data point on its prior values. Accordingly, the lag parameter estimator 206 may compute the AR data component 224 using the first correlation parameter (P) 228. In other words, the lag parameter estimator 206 may compute data points corresponding to the fifth set of data points using the first correlation parameter (P) 228. Furthermore, as described earlier, the distribution of a fifth set of data points may be indicative of regression of the fourth set of data points over a first lag time interval i.e. a lag time interval at which high correlation exists between two data points. Furthermore, based on the computation of the AR data component 224, the lag parameter estimator 206 may estimate future data points corresponding to the irregular data component 122.

Referring to the second plot 704, illustrated in FIG. 7, Y axis represents correlation values 712 and X axis represents lag intervals 714. The correlation values 712 represented on Y axis may be indicative of a correlation between error versions of two data points of the irregular data component 222, at a defined lag time interval. For example, as illustrated in the plot 704, at lag time interval '0', the correlation value on Y axis is '−0.19'. Furthermore, at lag time interval '4', the correlation value is '0.2'. The lag parameter estimator 206 may identify lag time intervals at which there exists high correlation, moderate correlation, or low correlation between error versions of two data points i.e. error versions of data points from amongst the fourth set of data points of the irregular data component 222, in a similar manner, as described for the first plot 702. However, for estimating future data points corresponding to the moving average data component 226 of the irregular data component 222, the lag parameter estimator, may only select lag interval values for the data points for which a correlation exceeds the second confidence threshold, as described in FIG. 2 and further described hereinafter.

The lag parameter estimator 206 may evaluate the second plot 704 to observe correlation values at various lag time intervals. The correlations value may be indicative of a first correlation between error version of a third data point z(t-lg') representing the network traffic at a third time instance (t-lg') and error version of a fourth data point z(t) representing network traffic at a fourth time instance (t). The fourth time instance (t) may be a time instance occurring subsequently after a lag time interval 'lg" to the third time instance (t-lg). Here, 'lg" represents a lag time interval represented on X axis of the second plot 704.

Furthermore, the lag parameter estimator 206 may determine, the second correlation parameter (Q) 230 based on comparison of the second correlation value and the second confidence threshold, as described earlier, in reference to FIG. 2. In accordance with various examples described herein, the second confidence threshold may correspond to pre-defined threshold value or may be a threshold value defined based on a user input. Illustratively, horizontal lines 716 and 718 along the X axis represents examples of the second confidence threshold. The second confidence threshold may be indicative of a threshold value beyond which any correlation value between two data points identified on the second plot 704 may be considered as a high correlation. In other words, if the first correlation value on Y axis in the second plot 704 is identified to be greater than or equal to the second confidence threshold, the lag parameter estimator 206 may record a high correlation existing between two data points at a corresponding lag of the time interval on X axis.

The lag parameter estimator 206 may evaluate the second plot 704 by comparing each correlation value at a respective lag interval against the second confidence threshold. Based on this comparison, the lag parameter may identify one or more lag intervals at which correlation between error versions of the two data points is observed to be high i.e. correlation value is more than the first confidence threshold. Accordingly, in a similar manner, as described for the first plot 702, the lag parameter estimator 206 may use this information to determine the second correlation parameter (Q) 230.

In accordance with various examples described herein, the second correlation parameter (P) represents a lag component at which a regression happens at error versions of a data point on its prior values. Accordingly, the lag parameter estimator 206 may compute the moving average data component 226 using the second correlation parameter (Q) 230.

Said differently, the lag parameter estimator 206 may compute data points corresponding to the sixth set of data points using the second correlation parameter (Q) 230. Furthermore, based on the computation of the moving average data component 226, the lag parameter estimator 206 may estimate future data points corresponding to the irregular data component 122. Accordingly, based on the AR data component 224 and the moving average data component 226, the lagged covariates, i.e., the lagged covariate factor 234, may be determined.

In some examples, the lag parameter estimator 206, may also determine a parameter 'D' indicative of a degree of differencing required to convert the time series distribution data 210 to a stationary time series. The lag parameter estimator 206, may determine the parameter 'D' for instances where a time series processed by the lag parameter estimator 206 may not be stable.

Figure 8:
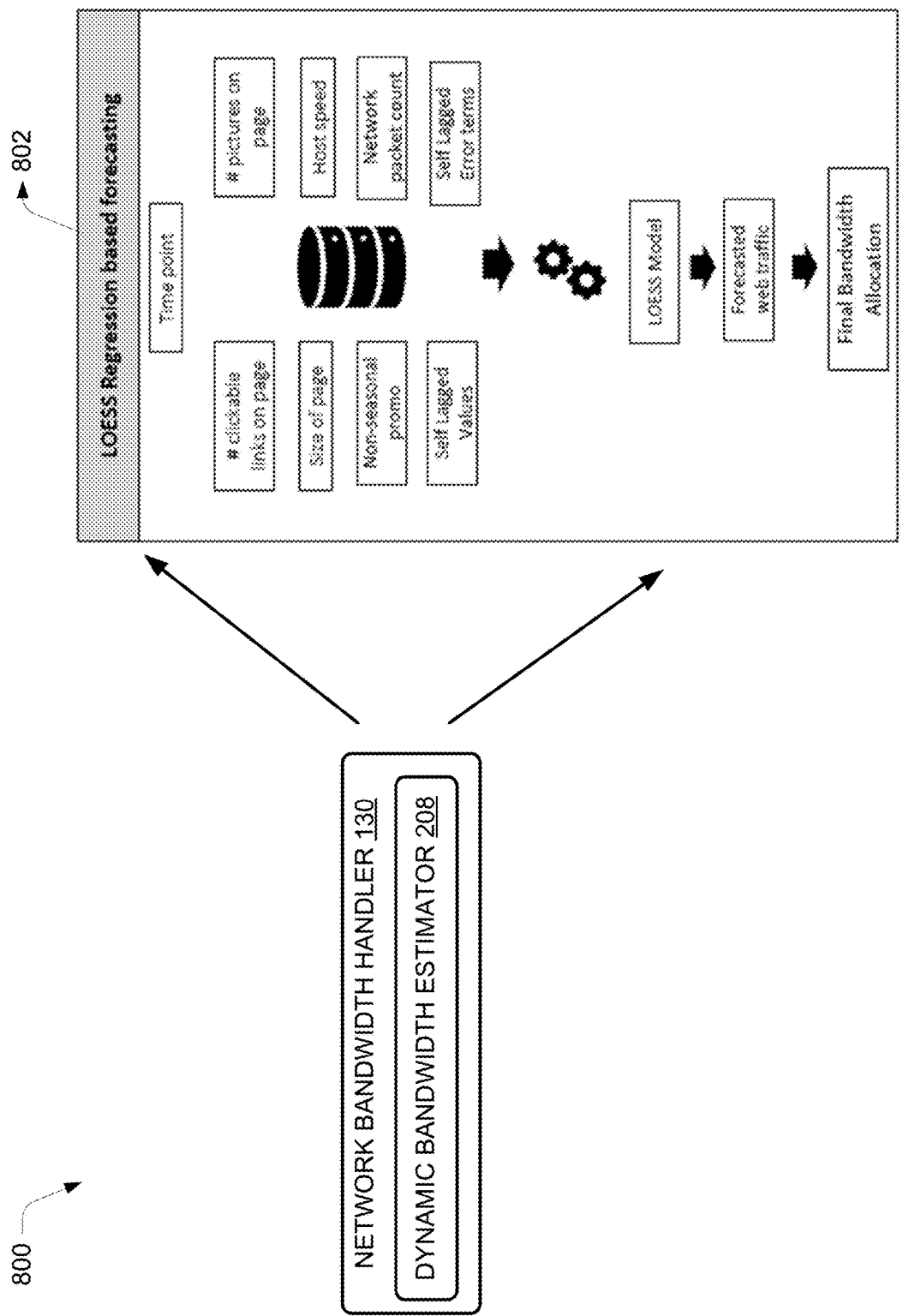
FIG. 8 illustrates a pictorial representation of estimation of bandwidth by a dynamic bandwidth estimator of a network bandwidth handler, according to an example embodiment of the present disclosure.

FIG. 8 illustrates a pictorial representation 800 of estimation of bandwidth for the server, by the dynamic bandwidth estimator 208, according to an example embodiment of the present disclosure. The dynamic bandwidth estimator 208, may determine an estimated network traffic for a future time point. Illustratively, view 802 depicts a pictorial representation of determination of estimated network traffic, by the dynamic bandwidth estimator 208. The dynamic bandwidth estimator 208 may utilize a LOESS i.e. a locally weighted scatter plot smoother model 236 to predict the estimated network traffic for the future time point and further determine the estimated bandwidth 232 based on the estimated network traffic. The dynamic bandwidth estimator 208 may compute one or more lagged variables based on the estimated parameters i.e. the first correlation parameter 228 and the second correlation parameter 230.

According to an example, the dynamic bandwidth estimator 208 may determine the estimated network traffic for the future time point based on various components computed by the baseline traffic estimator 204 and the lag parameter estimator 206. For instance, the dynamic bandwidth estimator 208 may determine the estimated network traffic for the future time point based on, the baseline distribution traffic data, the covariate metrics 214, and the lagged covariate factor 234. The lagged covariate factor 234 may be computed by the dynamic bandwidth estimator 208 may compute based on the AR data component 224 and/or the moving average data component 226. The lagged covariate factor 234 may be indicative of lagged versions of one or more external covariate metrics i.e. the covariate metrics 214, as described in reference to FIG. 2.

Furthermore, according to an example, the dynamic bandwidth estimator 208 may provide a plurality of inputs to the LOESS model. For instance, as illustrated in the view 802, the inputs to the LOESS model may comprise one or more of: clickable links on a web page of a web site hosted by the server, images on the web page, audio or video content on the web page, size of the web page, non-seasonal promotional offer on the web page, computational capability or speed of the server hosting the web page, network packet count, self-lagged values, self-lagged error terms etc. Along with these covariate metrics 214, the inputs to the LOESS model may also comprise the baseline distribution traffic data, the lagged covariate factor 234, and other such data. The dynamic bandwidth estimator 208 may construct the LOESS model 236 on the inputs provided to the LOESS model 236. The LOESS model 236 may be represent a local polynomial regression model. The dynamic bandwidth estimator 208 may construct the LOESS model by performing a local weighted regression on the inputs. The dynamic bandwidth estimator 208 may use the LOESS model based on a pre-defined smoothing parameter to construct a plot. The plot may represent a polynomial smooth curve that mat fits between the network traffic and remaining covariates. Furthermore, in some examples, the dynamic bandwidth estimator 208 may utilize a polynomial equation as stated below for determining constructing the plot that fits the smooth curve:

$$y = m(1)*x^k + m(2)*x^{k-1} + c \ldots (k>1)$$

Accordingly, the dynamic bandwidth estimator 208 may use the above equation used for constructing the plot i.e. the polynomial curve. An example of the polynomial curve that may be constructed by the dynamic bandwidth estimator 208 using the above equation is illustrated in FIG. 9.

In accordance with some example implementations of the present disclosure, performing the locally weighted smoothing regression may be best used in a context, when an underlying relationship of predictors and predicted variables may not seem to be following any certain pattern in the historical traffic data. In some examples, the external covariates used for determination of the estimated network traffic may be numerical or categorical. In some examples, the local regression technique of the LOESS model may involve locally fitting any function and providing an additional weight on each of the covariate depending on a likelihood with a point of interest.

Figure 9:
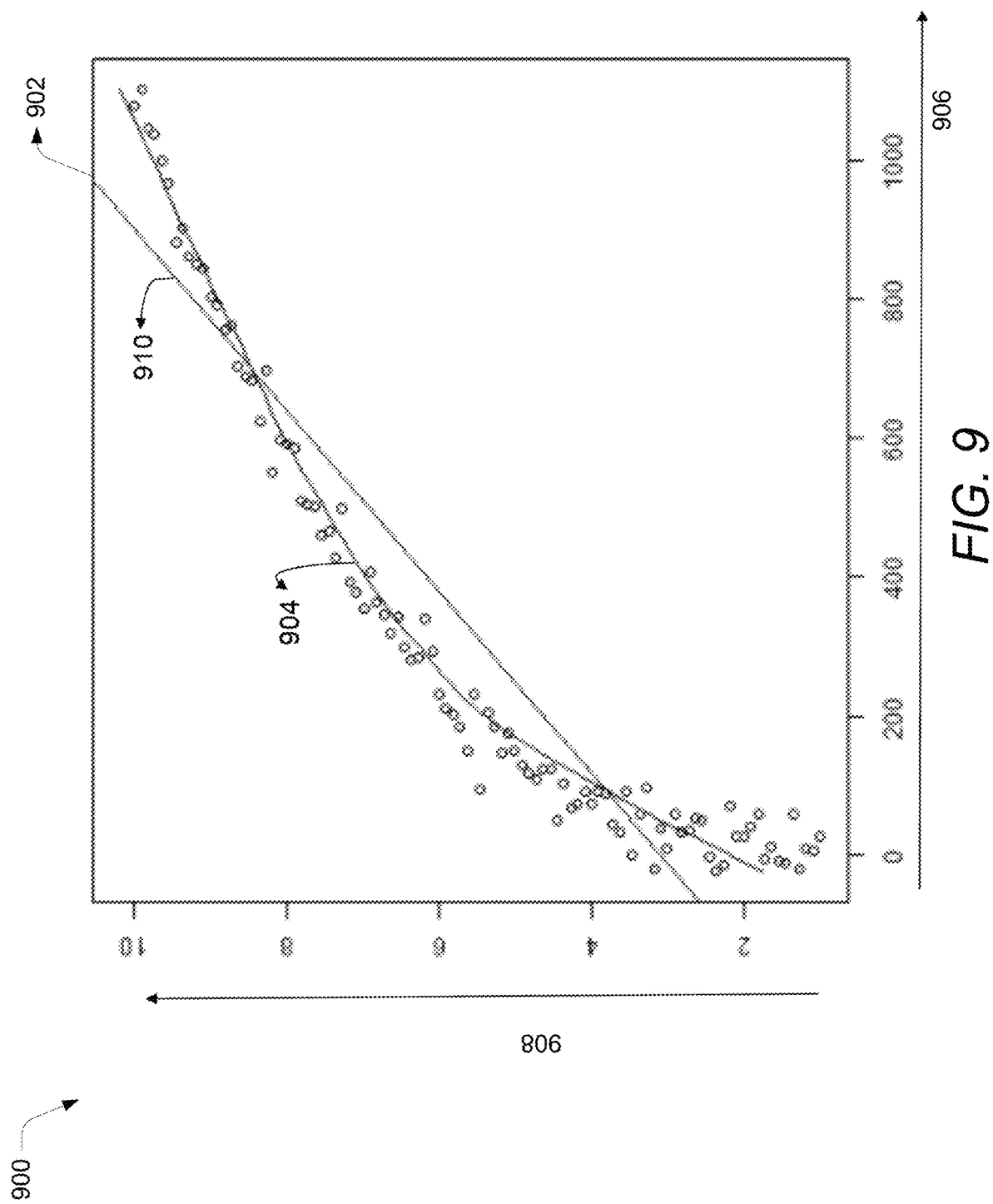
FIG. 9 illustrates a pictorial representation of a plot representing a smooth polynomial curve constructed by a network bandwidth handler, in accordance with an example implementation of the present disclosure.

FIG. 9 illustrates a pictorial representation 900 of a plot 902 representing the smooth polynomial curve constructed by the dynamic bandwidth estimator 208 by using the LOESS model, in accordance with an example implementation of the present disclosure. In accordance with some examples, the LOESS model 236 may output the estimated network traffic for the future time point, as a function of various components like, the baseline traffic distribution, lagged covariates, external covariates etc. The polynomial curve 904, as illustrated in FIG. 9 is representative of the afore-stated function. In other words, the polynomial curve 904 is representative of a curve constructed by the dynamic bandwidth estimator 208 using the polynomial equation described earlier.

The dynamic bandwidth estimator 208 may identify smaller segments time intervals on X axis 906, based on observed values of covariates. For instance, fora range (0>x<1000) illustrated on X axis 906 the dynamic bandwidth estimator 208 may identify smaller segments on the X axis 906 i.e. ranges 1-10, 10-20, 20-30, 30-50, 50-100 . . . and so on. Furthermore, the dynamic bandwidth estimator 208 may fit data points using the polynomial equation, as described earlier for each of the identified segments. Furthermore, the dynamic bandwidth estimator 208 may integrate all such portions of small polynomial curves corresponding to the identified segments on the X axis 906 to construct a final curve, i.e. the polynomial curve 904. Furthermore, the dynamic bandwidth estimator 208 may predict or forecast the estimated network traffic based on the polynomial curve 904.

The dynamic bandwidth estimator 208, based on output of the LOESS model 236, i.e. predicted network traffic for the future time point, may compute the bandwidth estimation 232 for the server and allocate the estimated bandwidth to the server, as described earlier in reference to FIGS. 1 and 2. The dynamic bandwidth estimator 208 may determine a minimum bandwidth requirement for the server based on multiplying the estimated network traffic for the future time to the size of web-pages hosted by the server. Furthermore, in some examples, the dynamic bandwidth estimator 208 may add a buffer value to the minimum bandwidth to determine the bandwidth estimation 232. The bandwidth estimation 232 may be used by the dynamic bandwidth allocator 140 for allocating network bandwidth to the server.

Figure 10:
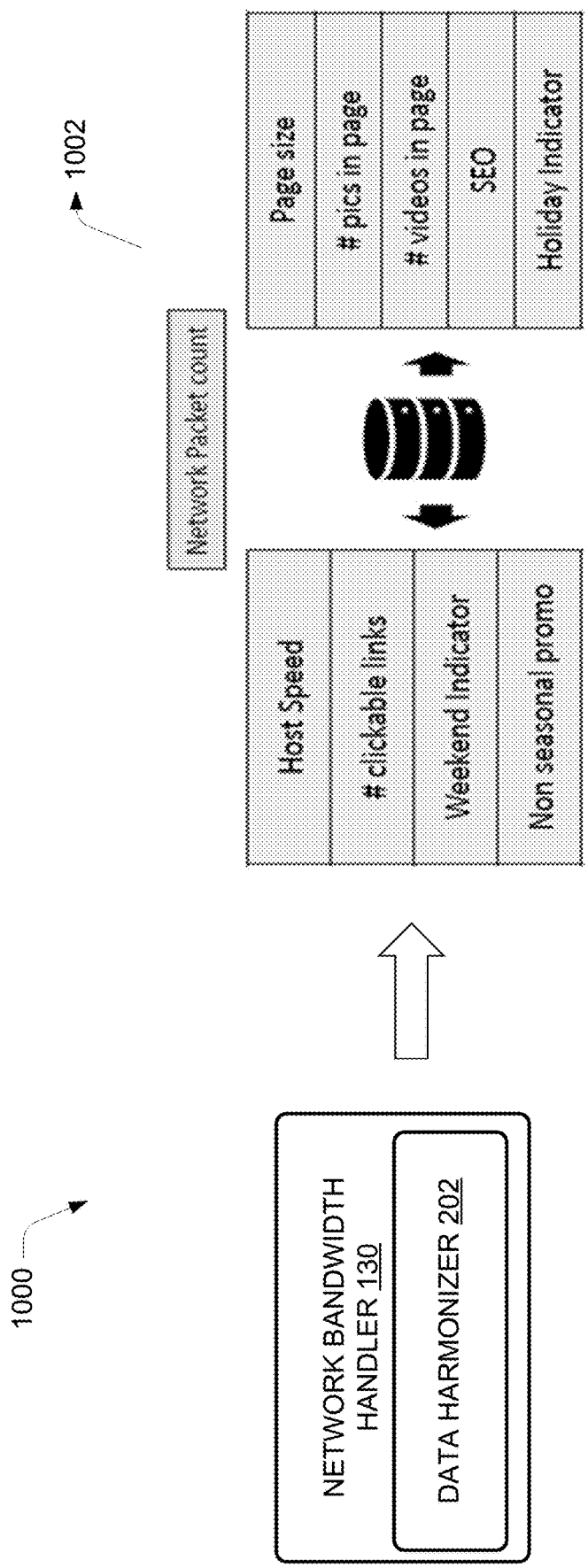
FIG. 10 illustrates a pictorial representation of data harmonization by a data harmonizer deployed by a network bandwidth handler, in an example use case, according to an example embodiment of the present disclosure.

FIGS. 10-13 illustrates pictorial representations of forecasting network traffic for future time point by the system 100 according to an example use case. The example use case referred herein relates to forecasting network traffic for a web server hosting a website of a food ordering application. FIG. 10 illustrates a pictorial representation 1000 of data harmonization by the data harmonizer 202, in an example use case, according to an example embodiment of the present disclosure. The data harmonizer 202 may access the time series distribution data 210 representing the network traffic at the website of food ordering application. The time series distribution data 210 accessed by the data harmonizer 202 may include data points $D_0$-Dn indicating an average count of network packets corresponding to covariates relevant at respective time instances ($T_1$-Tn) for the food ordering application. The data harmonizer 202 may collect the time series distribution data 210 in a defined format, for instance, in a chronological order of day part time i.e. morning, afternoon, and evening. These data points may be recorded at pre-defined time intervals and arranged in a sequential order to represent a distribution of data values over the pre-defined time period.

As described earlier in reference to FIG. 2, various portions or segments of the distribution of data points in the time series distribution data 210 may represent a distribution of various portions of network traffic that may have been developed due to various external factors. In this case, the external factors may correspond to factors applicable in context of the food ordering application. Thus, various portions of the network traffic represented as segments in the distribution of the time series distribution data 210 may be correlated to these external factors. An example of the external factors applicable for the afore-stated use case of the food ordering application is illustrated in view 1002. For example, the external factors influencing development of the network traffic or its any portion thereof at the web server hosting the food ordering application, may be, clickable links on a web page of a web site hosted by the server, images on the web page, audio or video content on the web page, size of the web page, non-seasonal promotional offer on the web page, computational capability or speed of the web server hosting the food ordering website, non-seasonal promotion, weekend indicator, holiday indicator, search engine optimization used for the web server, etc. As described earlier, these external factors may be represented as the covariate metrics 214 predominantly applicable at pre-defined time intervals of the pre-defined time period. Thus, each data point of the distribution of data points in the time series distribution data 210 accessed by the data harmonizer 202, may be identified or flagged with one or more of these external factors or the covariate metrics 214, to which it may be correlated.

FIG. 11 illustrates a pictorial representation of baseline distribution traffic data computed by the baseline traffic estimator 204, in accordance with an example use case of the present disclosure. The baseline traffic estimator 204 may access the time series distribution data 210. The time series distribution data 210 may include a distribution of data points representative of the network traffic corresponding to the food ordering application on the server. In some examples, the time series distribution data 210 may represent pre-stored historical network traffic data that may be used in a training phase of constructing a model for forecasting network traffic. FIG. 11 illustrates an example plot 1102 representing the time series distribution data 210 of the food ordering application.

Furthermore, as described earlier in reference to FIGS. 1, 2, 6A-6D, the baseline traffic estimator 204 may decompose the time series distribution data 210, into various data components. For instance, the baseline traffic estimator 204 may decompose the time series distribution data 210 to obtain the trend data component 216, the seasonal data component 218, the cyclic data component 220, and the irregular data component 222. As described earlier, breaking the time series distribution data 210 into each of these data components that may be represented as unobserved stochastic processes which enables providing an explanation or definition to dynamic features of chronological series of the data points and a manner in which the data points change over time.

Plots 1104, 1106, and 1108 represents distribution of the trend data component 216, the seasonal data component 218, and the irregular data component 222, respectively. Illustratively, plot 1104 representing the trend data component 216 shows no increasing or decreasing trend. Furthermore, the plot 1106 representing distribution of seasonal data component 218 shows dense distribution of data points in form of rectangular blocks. In an example, it may be because the data points corresponding to the seasonal data component 218 may be recorded at frequent time intervals. For example, seasonal data may be recorded daily for each day part i.e. morning, afternoon, and evening during the day.

The baseline traffic estimator 204 may compute the baseline distribution traffic data, as described earlier in reference to FIGS. 1, 2, 6A-6D. The baseline traffic estimator 204 may perform an estimation by extending values of the trend data component 216 as represented in the plot 1102, the seasonal data component 218 as represented in the plot 1104 for a future time point, thereby constructing a baseline distribution. The baseline distribution traffic data may be indicative of a base count of network packets over the pre-defined time period. Plot 1110 illustrates the baseline distribution traffic data indicating a baseline of distribution of data points computed by the baseline traffic estimator 204.

Illustratively, a first distribution 1112 on the plot 1110 represents the baseline distribution traffic data computed by the baseline traffic estimator 204 on the time series data 210 i.e. the plot 1102. Furthermore, a second distribution 1114 represents actual network traffic data that may have been observed for the pre-defined time period. Illustratively, the first distribution 1112 i.e. representing the baseline distribution traffic data overlaps some, but not all, portion of the second distribution 1114. Said differently, the plot 1110 illustrates a manner in which the baseline distribution traffic data i.e. the first distribution 1112 may vary with the actual time series distribution i.e. the second distribution 1114 accessed during the training phase. Therefore, a further analysis on the irregular component 222 of the time series distribution data 210 may be performed by the system 100 so as to match the estimation computed by the system 100 with actual observations of the network traffic data.

FIG. 12 illustrates a pictorial representation of an example of computation of the AR data component 224 and the moving average data 226 component from the irregular data component 222 by the lag parameter estimator 206, according to the example use case of the food ordering application. Plot 1202 represents the irregular data component 222 obtained after the decomposition of the time series distribution data 210, as described in FIG. 11. The lag parameter estimator 206 may express the irregular data component 222 as a weak stationary process. The lag parameter estimator 206 may construct an auto-regressive moving average model that may provide a strict depiction of a weak stationary stochastic process in terms of polynomials viz. the AR data component 224 and the moving average data component 226. Furthermore, the lag parameter estimator 206 may identify the AR data component 224 and the moving average data component 226, from the irregular data component 222.

The lag parameter estimator 206 may construct a plot 1204 using the ACF and a plot 1206 using the PACF, in a similar manner as described earlier in FIG. 7. The plot 1206 may represent a distribution of correlation values between data points representing network traffic corresponding to the food ordering application, over lagged time intervals. Furthermore, the plot 106 may represent a distribution of correlation between error versions of the data points representing network traffic corresponding to the food ordering application, over lagged time intervals. Furthermore, the lag parameter estimator 206 may compute the first correlation parameter (P) 228 and the second correlation parameter (Q) 230, in a similar manner, as described earlier in reference to FIG. 7. For the afore-stated example use case, the lag parameter estimator 206 may compute the first correlation parameter (P) 228 as '1' and the second correlation parameter (Q) 230 as '0'. A value of the parameter 'D' indicative of a degree of differencing may be used as '0', as the time series distribution data 210 for the example use case is stationary in nature.

Figure 13:
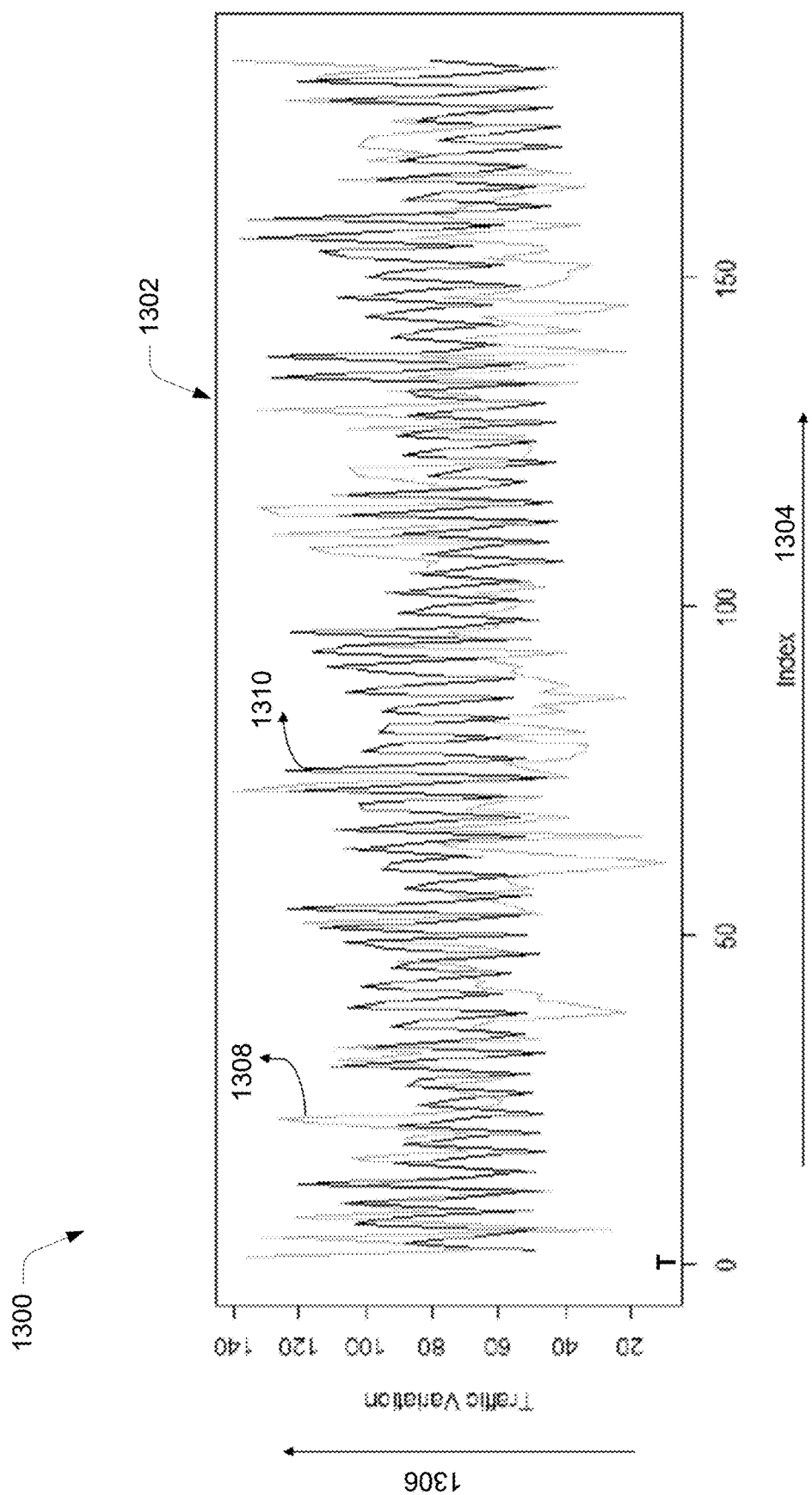
FIG. 13 illustrates a pictorial representation of results indicating estimated network traffic computed by a network bandwidth handler, according to an example implementation of the present disclosure.

FIG. 13 illustrates a pictorial representation 1300 of results indicating estimated network traffic computed by the network bandwidth handler 130, according to an example implementation of the present disclosure. A plot 1302 of FIG. 13 illustrates a first series distribution indicating estimated network traffic computed by the network bandwidth handler 130 for the pre-defined time period during a testing phase against an actual network traffic observed during the pre-defined time period. Illustratively X axis 1304 of the plot 1302 represents a time period starting from time instance T (0) to time instance T (n). Furthermore, Y axis 1306 of the plot 1302 represents an average count of network packets at the server. As illustrated, the plot 1302 includes two series distribution viz. a first series distribution 1308 and a second series distribution 1310. The first series distribution 1308 may represent actual time series distribution data 210 that may have been observed at the server. Furthermore, the second series distribution 1310 represents an estimated time series distribution, i.e. expected network traffic computed by the network bandwidth handler 130, computed during the testing phase, in accordance with the example implementation of the present disclosure. According to an example, the time period T (0)-T (n) may include a range corresponding to a future time interval. As illustrated in the plot 1302, there exists significant overlapping between the first series distribution 1308 and the second series distribution 1310. The overlapping of the first series distribution 1308 and the second series distribution 1310 may indicate that the estimated network traffic matches significantly with the actual network traffic observed at the server.

The network bandwidth handler 130 may use the estimated network traffic i.e. the second series distribution 1310 to compute a bandwidth requirement for the server. The network bandwidth handler 130 may compute the bandwidth estimation based on techniques as described earlier in reference to FIGS. 1 and 2. The network bandwidth handler 130 may identify from the estimated network traffic i.e. the second time series distribution 1310 that estimated forecasts for a next day are '47', '87', and '50'. Accordingly, the network bandwidth handler 130 may compute the bandwidth estimation i.e. bandwidth requirement for future time point based on the estimated forecasts using techniques as described earlier in reference to FIGS. 1 and 2. According to said example, the network bandwidth handler 130 may compute a bandwidth requirement of the server for the next day as 100 MB in morning and evening, and 200 MB for afternoon. In another example, the network bandwidth handler 130 may identify from the estimated network traffic i.e. the second time series distribution 1310 that estimated forecasts for a day of a next month are '57', '130', and '74'. Accordingly, the network bandwidth handler 130 may compute the bandwidth requirement of the server for the day of next month as 120 MB for morning, 275 MB for afternoon, and 150 MB for evening. Furthermore, in accordance with some examples, the dynamic bandwidth allocator 140 may access bandwidth requirement computed by the network bandwidth handler 130 and accordingly, allocate network bandwidth to the server.

FIG. 14 illustrates a pictorial representation of an example use case of dynamic bandwidth allocation based on forecasted traffic, by the dynamic bandwidth allocator 140 according to an example implementation of the present disclosure. Illustratively, a view 1402 depicts an example operation of network bandwidth management by the system 100. The network bandwidth operation, as illustrated in the view 1402, depicts steps of load balancing and dynamic bandwidth allocation at the server.

According to an example, a cloud computing based set up, for example, the web service 304 as described in FIG. 3 may include the dynamic bandwidth allocator 140 and the load balancer 150. As described earlier in FIG. 3, the dynamic bandwidth allocator 140 may manage bandwidth allocation for multiple servers. Furthermore, the load balancer 150 may perform load balancing of the network traffic at the multiple servers. The multiple servers referred herein may correspond to multiple host servers hosting one or more websites. In an example, separate spaces may be allocated to multiple web servers and data warehouses used in a business, by the web service. Furthermore, as illustrated in the view 1402, information from different sources may flow into a data warehouse including web servers, log servers, etc. The information may be indicative of current network traffic at multiple host servers. In one example, the system 100 may leverage information residing in the data warehouse and output it to the web server to accommodate the network traffic.

To perform load balancing, the load balancer 150 may distribute the network traffic to the multiple servers. For example, the load balancer 150 may distribute the network traffic to different web hosts including a website. These hosts may have a pre-defined bandwidth. Furthermore, in an instance, when concurrent traffic flow is increased, the load balancer 150 may distribute the network traffic to multiple host servers. The load balancer 150 may distribute the network traffic to multiple hosts servers based on techniques as described earlier, in reference to FIGS. 1-3. The load balancer 150 may distribute the network traffic to different host servers based on pre-defined rules specific to an environment.

Furthermore, according to an example, the system 100 may utilize time series data e.g. the time series distribution data 210 or historical network traffic data from the data warehouse to provide an early insight on future network traffic. For example, the network bandwidth handler 130 may provide an estimation of the network traffic for future time point, in a similar manner as described in reference to FIGS. 1-13. Furthermore, the dynamic bandwidth allocator 140 may use this information to dynamically allocate bandwidth to the multiple host servers. The bandwidth allocated to the host servers may suitably accommodate the concurrent traffic visiting the host servers or website hosted by the host servers.

Figure 15:
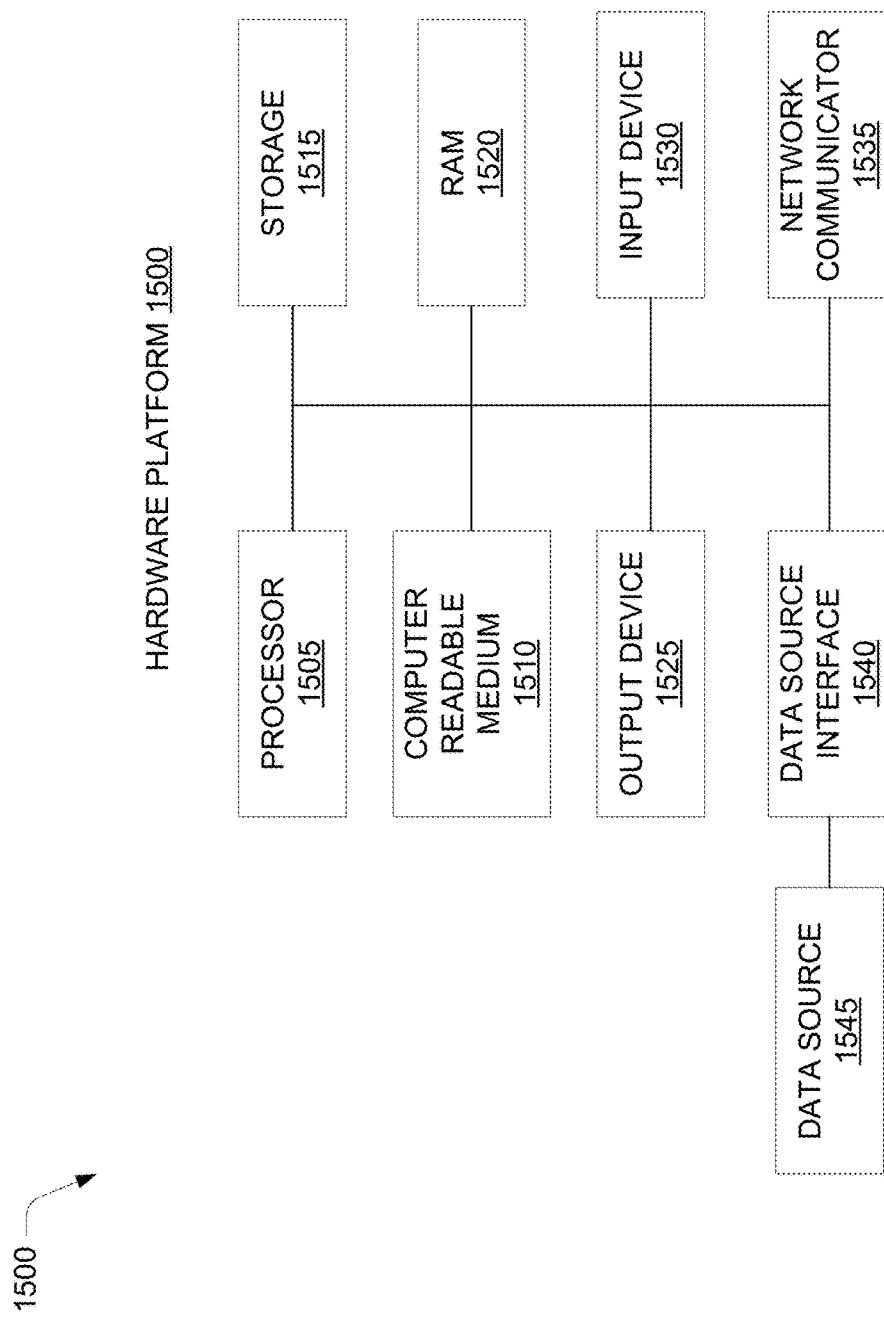
FIG. 15 illustrates a hardware platform for implementation of a system for network bandwidth management, according to an example embodiment of the present disclosure.

FIG. 15 illustrates a hardware platform 1500 for implementation of the system 100, according to an example embodiment of the present disclosure. Particularly, computing machines such as but not limited to internal/external server clusters, quantum computers, desktops, laptops, smartphones, tablets and wearables which may be used to execute the system 100 or may have the structure of the hardware platform 1500. The hardware platform 1500 may include additional components not shown and that some of the components described may be removed and/or modified. In another example, a computer system with multiple GPUs can sit on external-cloud platforms including Amazon Web Services, or internal corporate cloud computing clusters, or organizational computing resources, etc.

Over FIG. 15, the hardware platform 1500 may be a computer system 1500 that may be used with the examples described herein. The computer system 1500 may represent a computational platform that includes components that may be in a server or another computer system. The computer system 1500 may execute, by a processor e.g., a single or multiple processors or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 1500 may include a processor 1505 that executes software instructions or code stored on a non-transitory computer-readable storage medium 1510 to perform methods of the present disclosure. The software code includes, for example, instructions to determine an estimated network traffic for a future time point for a server, provide an estimated bandwidth based on the estimated network traffic, and allocate network bandwidth dynamically based on the estimated bandwidth. The network bandwidth handler 130 i.e. comprising one or more of the data harmonizer 202, the baseline traffic estimator 204, the lag parameter estimator 206, the dynamic bandwidth estimator 208, the dynamic bandwidth allocator 140, and the load balancer 150 may be software codes or components performing these steps.

The instructions on the computer-readable storage medium 1510 are read and stored the instructions in storage 1515 or in random access memory (RAM) 1520. The storage 1515 provides a large space for keeping static data where at least some instructions could be stored for later execution. The stored instructions may be further compiled to generate other representations of the instructions and dynamically stored in the RAM 1520. The processor 1505 reads instructions from the RAM 1520 and performs actions as instructed.

The computer system 1500 furthermore includes an output device 1525 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1500 furthermore includes input device 1530 to provide a user or another device with mechanisms for entering data and/or otherwise interact with the computer system 1500. The input device 1530 may include, for example, a keyboard, a keypad, a mouse, or a touchscreen. The input device 1530 may be used to provide an input of a time interval, for example, the pre-defined time period by a user. In an example, an output of any of the network bandwidth handler 130, the dynamic bandwidth allocator 140, and the load balancer 150 may be displayed on the output device 1525. Each of these output devices 1525 and input devices 1530 could be joined by one or more additional peripherals. The output device 1525 may be used to display an estimated bandwidth of the server. In another example, the output device 1525 may be used to display allocated network bandwidth to the server. In another example, the output device 1525 may be used to display a current network traffic at the server, and a load balancing performed by the load balancer 150 based on the current network traffic and the estimated bandwidth.

A network communicator 1535 may be provided to connect the computer system 1500 to a network and in turn to other devices connected to the network including other clients, servers, data stores, and interfaces, for instance. A network communicator 1535 may include, for example, a network adapter such as a LAN adapter or a wireless adapter. The computer system 1500 includes a data source interface 1540 to access data source 1545. A data source is an information resource. As an example, a database of exceptions and rules may be a data source. Moreover, knowledge repositories and curated data may be other examples of data sources.

FIGS. 16-21 illustrates methods 1600, 1700, 1800, 1900, 2000, and 2100 collectively referred hereinafter as methods 1600-2100 for sake of brevity for the system 100 for network bandwidth management, according to an example embodiment of the present disclosure.

It should be understood that method steps are shown here for reference only and other combinations of the steps may be possible. Furthermore, the methods 1600-2100 may contain some steps in addition to the steps shown in FIGS. 16-21. For the sake of brevity, construction and operational features of the system 100 which are explained in detail in the description of FIGS. 1-15 are not explained in detail in the description of FIGS. 16-21. The methods 1600-2100 may be performed by a component of the system 100, such as the processor 120, the network bandwidth handler 130, the dynamic bandwidth allocator 140, and the load balancer 150. In some examples, one or more steps of the methods 1600-2100 may be performed by components such as, the data harmonizer 202, the baseline traffic estimator 204, the lag parameter estimator 206, and the dynamic bandwidth estimator 208 of the network bandwidth handler 130.

Figure 16:
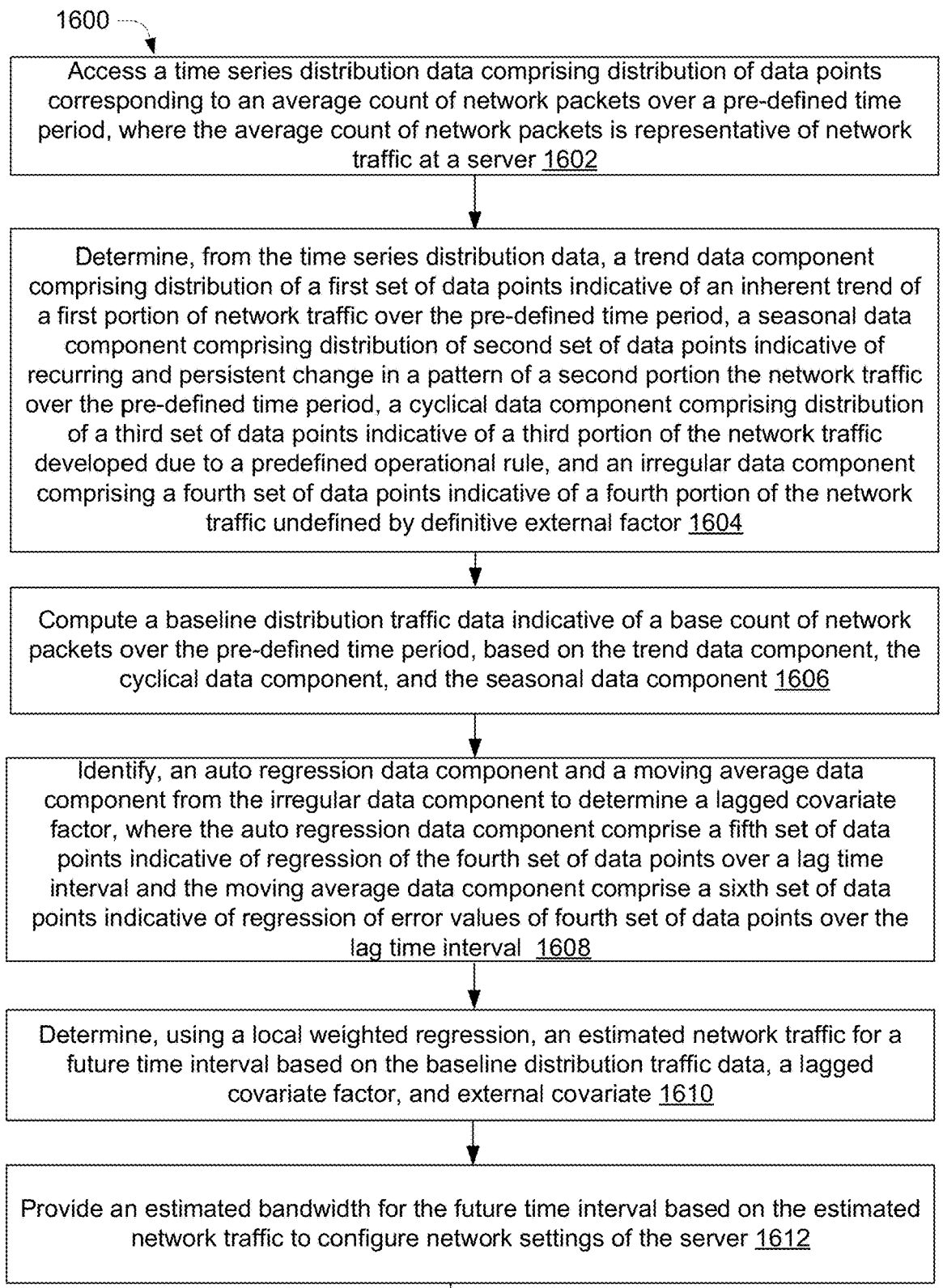

FIG. 16 illustrates a process flowchart of a method 1600 for estimating bandwidth of a server by the system 100, in accordance with an example embodiment of the present disclosure.

At block 1602, the time series distribution data 210 may be accessed. The time series distribution data 210 may comprise distribution of data points corresponding to an average count of network packets collected over a pre-defined time period. The average count of network packets, referred herein, may be representative of network traffic at a server at a given instance or time or a time interval.

In some examples, the time series distribution data 210 may be representative of the distribution of the average count of network packets collected in a chronological order at pre-defined time intervals of the pre-defined time period. In some examples, the pre-defined time period may be defined by a user input or may be defined based on a business context or a pre-defined rule, for example, but not limited to, a business cycle, a quarter of a fiscal year, etc. Furthermore, in some examples, the time series distribution data 210 may also represent distribution of the average count of network packets corresponding to one or more portions of network traffic developed due to various covariate metrics, applicable at various time intervals, within the pre-defined time period.

At block 1604, (i) the trend data component 216, (ii) the cyclical data component 220, (iii) the seasonal data component 218, and (iv) the residual or the irregular data component 222 may be determined from the time series distribution data 210. The trend data component 216 may comprise a distribution of a first set of data points over the pre-defined time period 212. The first set of data points may be indicative of development or inherent trend of a first portion of the network traffic. Furthermore, the seasonal data component 218 may comprise a distribution of second set of data points. The second set of data points may be indicative of recurring and persistent change in a pattern of a second portion the network traffic over the pre-defined time period 212. Furthermore, the cyclical data component 220 may comprise distribution of a third set of data points. The third set of data points may be indicative of a third portion of the network traffic developed due to a predefined operational rule. Furthermore, the irregular data component 222 may comprise a fourth set of data points indicative of a fourth portion of the network traffic undefined by definitive external factor.

At block 1606, a baseline distribution traffic data may be computed. The baseline distribution traffic data may be indicative of a base count of network packets over the pre-defined time period 212. The baseline distribution traffic data may be computed based on the trend data component 216, the cyclical data component 220, and the seasonal data component 218. For instance, in some examples, the baseline distribution traffic data may be computed in a similar manner as described in reference to FIGS. 1-14.

Moving to block 1608, the AR data component 224 and the moving average data component 226 may be identified from the irregular data component 222 to determine a lagged covariate factor. The AR data component 224 may comprise a distribution of a fifth set of data points. The fifth set of data points may be indicative of regression of the fourth set of data points over a lag time interval. Furthermore, the moving average data component 226 may comprise a distribution of a sixth set of data points. The sixth set of data points may be indicative of regression of error values of the fourth set of data points over the lag time interval. According to some examples, the AR data component 224 may be computed in a similar manner as described in reference to FIGS. 7 and 12. Furthermore, in some examples, the moving average data component may be computed in a similar manner as described in in reference to FIGS. 7 and 12. At block 1610, an estimated network traffic for a future time interval may be determined. The estimated network traffic for the future time interval may be determined based on (a) a lagged covariate factor 234, (b) the baseline distribution traffic data component and (c) the external covariates, i.e., the covariate metrics 214. In an example, a local weighted regression on various key metrics and data points may be performed. For instance, the local weighted regression may be performed on inputs such as the baseline distribution traffic data, the covariate metrics 214, and the lagged covariate factor 234 using the LOESS model to determine the estimate network traffic for the future time point.

Furthermore, a LOESS model, as described in FIGS. 1-13, may be constructed to determine the estimated network traffic based on the local weighted regression using a pre-defined smoothing parameter. The LOESS model may utilize the covariate metrics 214, the baseline distribution traffic data component, and the lagged covariate factor 234 computed from the AR data component 224, and the moving average data component 226, as inputs to construct a polynomial curve which may be used to identify data points corresponding to forecasted network traffic.

In some examples, the lagged covariate factor 234 may correspond to covariate factors constructed based on modification to covariate factors existing in past over a lag time period. In some examples, the lagged covariate factor 234 may be constructed based on the AR data component 224 and the moving average data component 226 as described earlier, in reference to FIGS. 1-13.

Moving to block 1612, the estimated bandwidth for the future time interval may be provided. The estimated bandwidth for the future time interval may be provided based on the estimated network traffic for the future time point. In some examples, the estimated bandwidth for the future time interval may be provided to dynamically allocate network bandwidth to the server to cater to a network traffic demand. Furthermore, the estimated bandwidth may be provided to configure network settings of the server.

In some examples, the method 1600 may further include one or more additional steps. For instance, in some examples, the method 1600 may further accessing the estimated bandwidth, i.e. the estimated bandwidth provided at the block 1612. Furthermore, a network bandwidth may be allocated to the server based on the estimated bandwidth for the future time interval and based on pre-stored network traffic data applicable for the server at a given instance of time. Further details of these additional steps as indicated by branch labelled 'A' in FIG. 16 are described in reference to FIG. 20.

FIG. 17 illustrates a process flowchart of a method 1700 for baseline traffic estimation from the time series distribution data 210 of network traffic, by the system 100, in accordance with an example embodiment of the present disclosure.

At block 1702, the time series distribution data 210 may be decomposed to obtain (a) the trend data component 216, (b) the seasonal data component 218, (c) the cyclic data component 220, and (d) the irregular data component 222. In some examples, the time series distribution data 210 may be decomposed in a similar manner as described in reference to FIGS. 1-15.

At block 1704, upon decomposition of the time series distribution data 210, the baseline distribution traffic data may be computed. The baseline distribution traffic data may be a function of: the trend data component 216, the seasonal data component 218, and the cyclical data component 220.

Figure 18:
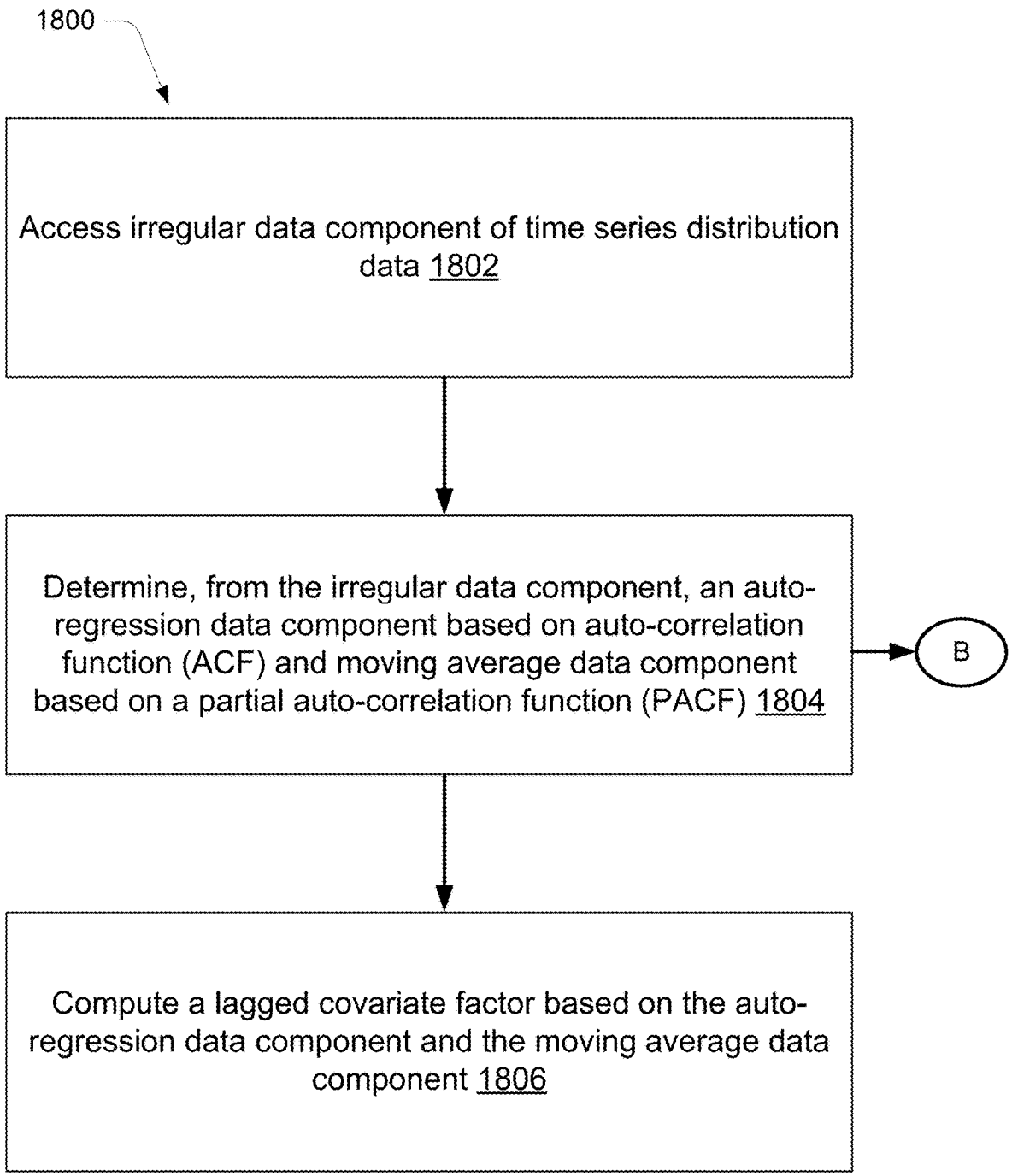

FIG. 18 illustrates a process flowchart of a method 1800 for computing a lagged covariate factor, by the system 100, in accordance with an example embodiment of the present disclosure.

At block 1802, the irregular data component 222 may be accessed. The irregular data component 222 may be obtained upon decomposition of the time series distribution data 210. In some examples, the irregular data component 222 may correspond to a residual data component of the time series distribution data 210. In other words, the irregular data component 222 may correspond to that portion of the network traffic which may be undefined by a definitive external factor. The irregular data component 222 may correspond to the distribution that may include the fourth set of data points collected over the pre-defined time period 212, as described in reference to FIGS. 1-15.

At block 1804, from the irregular data component 222, the AR data component 224 and the moving average data 226 component may be determined. The AR data component 224 may be determined based on the auto-correlation function (ACF). Furthermore, the moving average data component 226 may be determined based on the partial auto-correlation function (PACF). The determination of the AR data component 224 and the moving average data 226 component may include additional steps. Further details of these additional steps as indicated by branch labelled 'B' in FIG. 18 are described in reference to FIG. 20.

At block 1806, a lagged covariate factor 234 may be computed based on the AR data component 224 and the moving average data component 226. In some examples, the lagged covariate factor 234 may be computed in a similar manner as described in reference to FIGS. 1-15.

Figure 19:
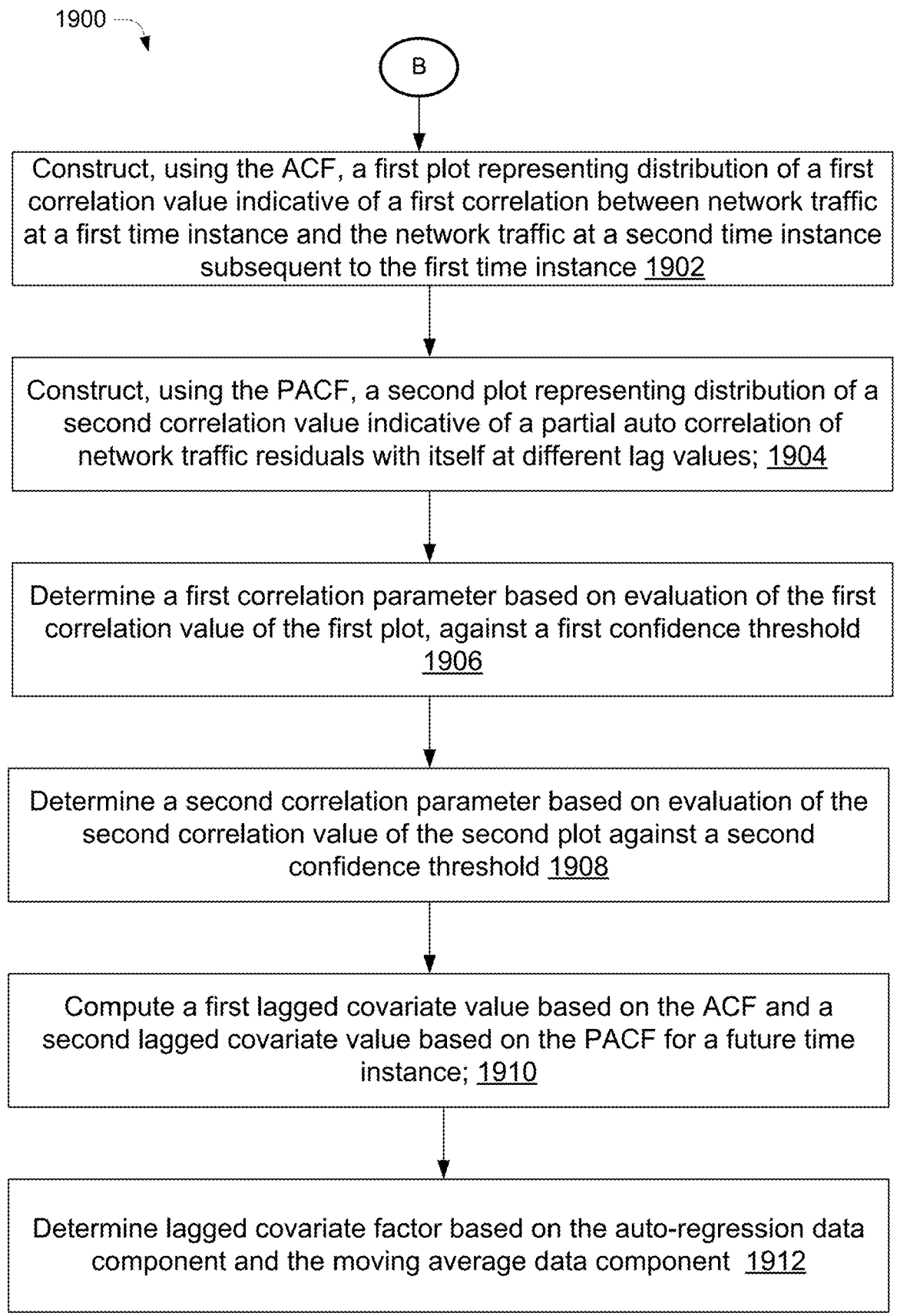

FIG. 19 illustrates a process flowchart of a method 1900 for computing the auto regression data component and the moving average data component, by the system 100, in accordance with an example embodiment of the present disclosure.

At block 1902, a first plot may be constructed using an auto correlation function. The first plot may represent a distribution of a first correlation value. The first correlation value may be indicative of a first correlation between the network traffic at a first time instance and the network traffic at a second time instance subsequent to the first time instance. The first plot 702, as illustrated in FIG. 7, is an example of the first plot that may be constructed at the block 1902. The first plot 1204, as illustrated in FIG. 12, is another example of the first plot that may be constructed at the block 1902.

At block 1904, a second plot may be constructed using a partial auto correlation function (PACF). The second plot may represent a distribution of a second correlation value. The second correlation value may be indicative of a partial auto correlation of network traffic residuals with itself at different lag values. In other words, the second correlation value indicates correlation between error versions associated with data points representing the network traffic at two different time instances. For example, the second correlation value may be indicative of correlation between an error version of a first data point representing network traffic at a third time instance and error version of a second data point representing network traffic at a fourth time instance subsequent to the third time instance. The second plot 704 illustrated in FIG. 7 is an example of the second plot that may be constructed at the block 1902. The second plot 1206 illustrated in FIG. 12 is another example of the second plot that may be constructed at the block 1904.

At block 1906, a first correlation parameter may be determined. The first correlation parameter may be determined based on evaluation of the first correlation value of the first plot, against a first confidence threshold. The first correlation parameter may be determined in a similar manner as described earlier in reference to FIGS. 1-15.

At block 1908, a second correlation parameter may be determined. The second correlation parameter may be determined based on evaluation of the second correlation value of the second plot, against a second confidence threshold. The second correlation parameter may be determined in a similar manner as described earlier in reference to FIGS. 1-15.

At block 1910, a first lagged covariate value based on the ACF and a second lagged covariate value based on the PACF for a future time instance may be computed. In an example, the first lagged covariate value may be computed using the first correlation parameter and based on the ACF and the second lagged covariate may be computed using the second correlation parameter and based on the PACF.

Further, at block 1912, the lagged covariate factor 234 may be determined based on the AR data component 224 and the moving average data component 226.

Figure 20:
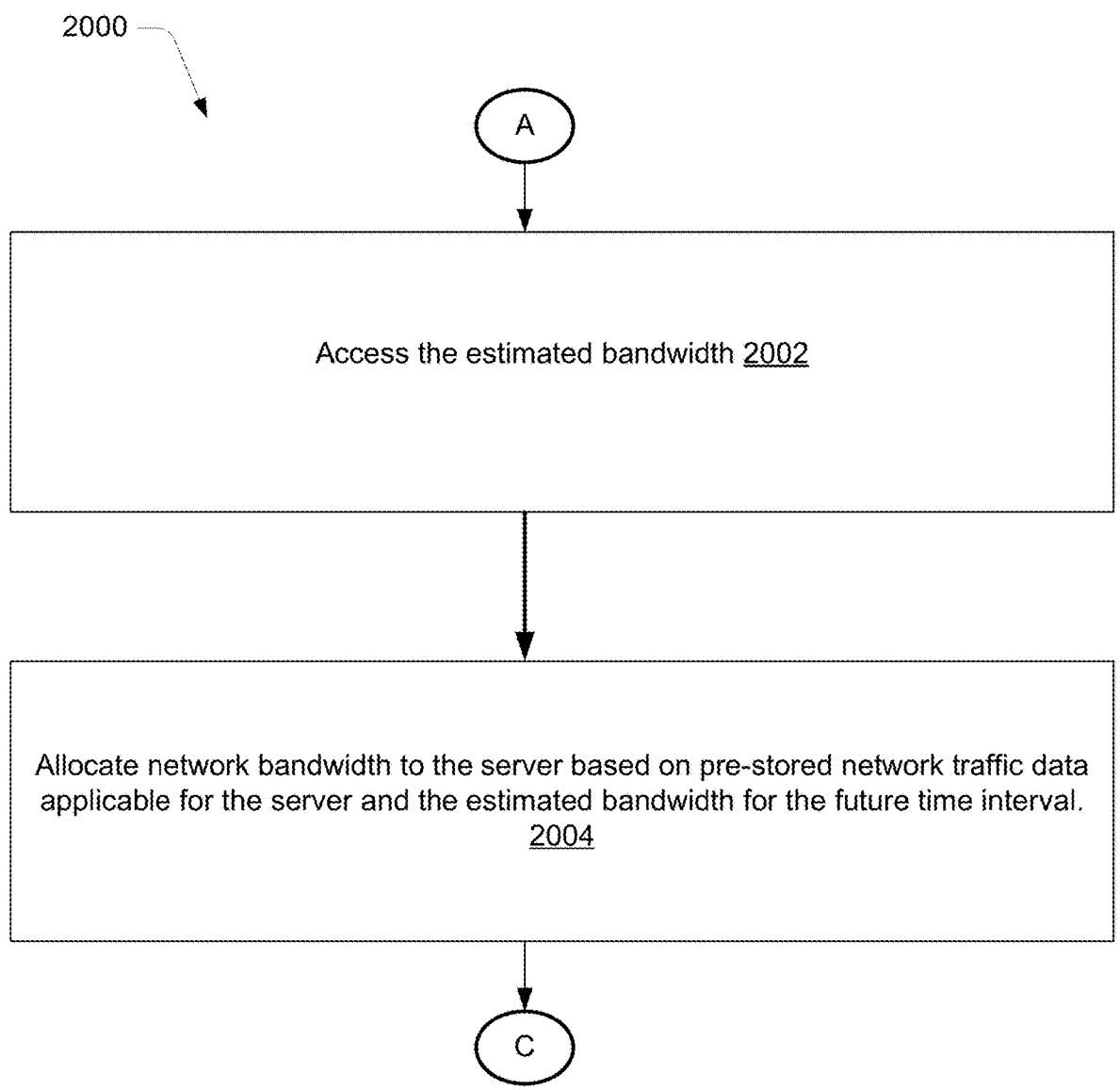

FIG. 20 illustrates a process flowchart of a method 2000 for dynamically allocating network bandwidth by the system 100, in accordance with an example embodiment of the present disclosure.

At block 2002, the estimated bandwidth may be accessed. In some examples, the dynamic bandwidth allocator 140 may access the estimated bandwidth determined by the network bandwidth handler 130.

At block 2004, network bandwidth may be dynamically allocated to the server. The allocation of the network bandwidth may be based on pre-stored network traffic data applicable for the server and the estimated bandwidth for the future time interval accessed at the block 2002. In some examples, the network bandwidth may be dynamically allocated in a similar manner, as described earlier, in reference to FIGS. 1-15. In some examples, the method 2000 may include additional steps of load balancing. These additional steps as indicated by branch labelled 'C' in FIG. 20 are described in reference to FIG. 21.

Figure 21:
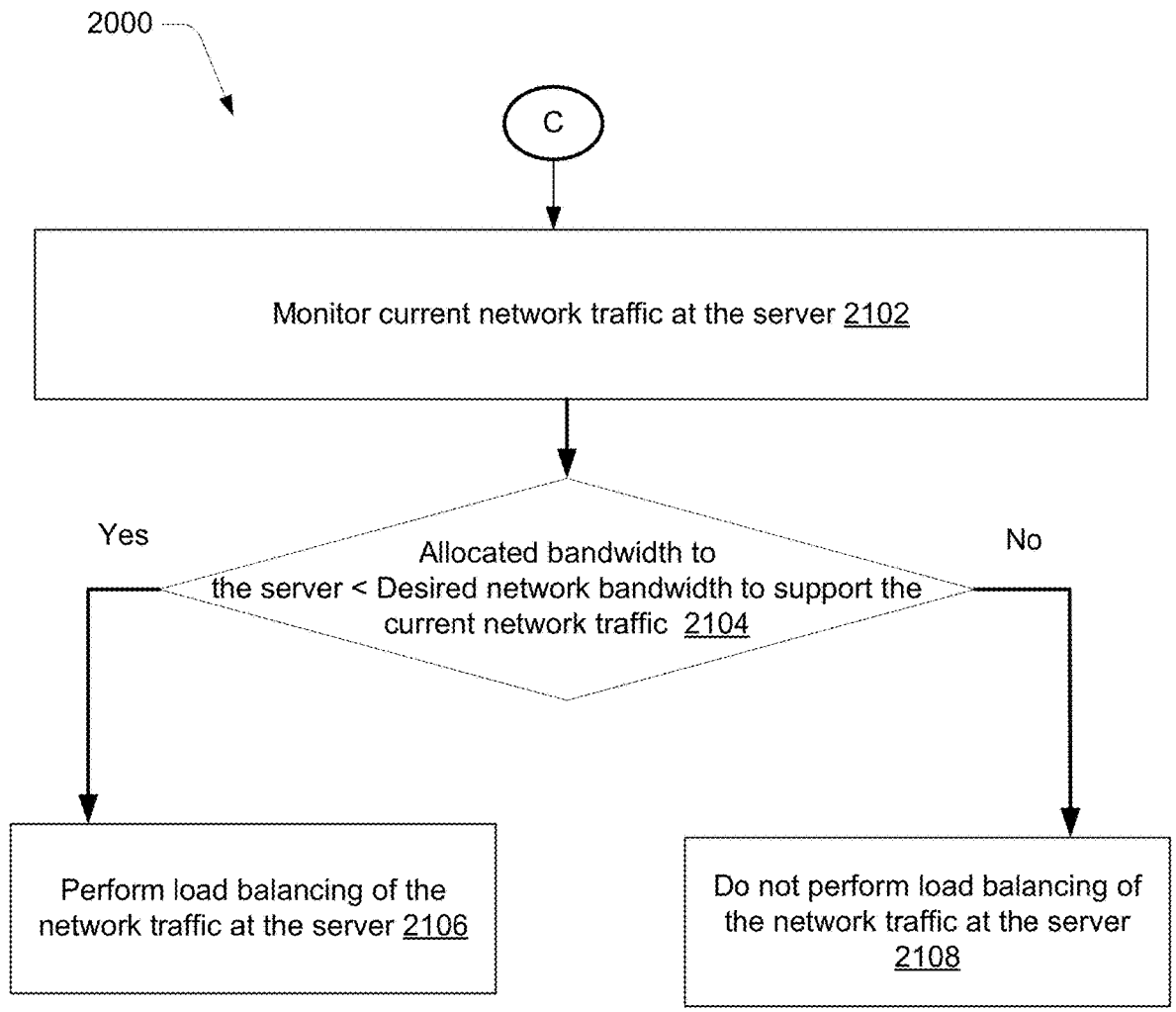

FIG. 21 illustrates a process flowchart of a method 2100 for load balancing of the network traffic by the system 100, in accordance with an example embodiment of the present disclosure.

At block 2102, the network traffic at the server may be monitored. In some examples, the load balancer 150 may monitor the network traffic at the server.

Moving to the block 2104, a comparison between the network bandwidth allocated to the server against a desired network bandwidth i.e. network bandwidth required to support network traffic at a current time interval may be performed. In an instance, when the allocated network bandwidth to the server is less than the desired network bandwidth, the method moves to the block 2106. However, in an instance, when the allocated network bandwidth to the server is more than the desired network bandwidth the method moves to the block 2108.

At block 2106, load balancing of the network traffic at the server may be performed. The load balancer 130 may perform the load balancing of the server. In response to determination that the network bandwidth allocated to the server is insufficient to support the current network traffic, the load balancer 150 may offload some of the current network traffic to another server. In some examples, the load balancing may be performed in a similar manner as described in reference to FIGS. 1-15.

Furthermore, in some examples, the load balancer 150 may notify the dynamic bandwidth allocator 140 and/or the network bandwidth handler 130 about the load balancing performed at the block 2106. For instance, the load balancer 150 may send a notification to the network bandwidth allocator 130 to modify allocation of the network bandwidth to the server so as to support a current network traffic demand. In accordance with some examples, the load balancer may also notify the network bandwidth handler 130 to take into consideration recent network traffic demanded at the server for estimation of the expected network traffic in near future. Thus, in some examples, the network bandwidth handler 130 may recursively update bandwidth forecasting for the future time based on load balancing notification received from the load balancer 130 after performing the load balancing as described at the block 2106.

At block 2108, load balancing of the network traffic at the server may not be performed. In an instance, when at the block 2104 it is determined that the network bandwidth allocated to the server may support the current network traffic. i.e. a current demand, no load balancing of the network traffic at the server may be performed. The server may continue to operate at the allocated network bandwidth until any further load balancing action is to be performed.

According to various examples described herein, the methods 1600-2100 may be practiced using a non-transitory computer-readable medium, for example, but not limited to the computer-readable medium 1510 as described in FIG. 15. In some examples, the methods 1600-2100 may be computer-implemented methods.

The present disclosure provides for the network bandwidth management. In some examples, the network bandwidth management may involve accurately forecasting or estimating an expected network traffic in future. Furthermore, in some examples, the network bandwidth management may involve efficient planning and dynamic allocation of the network bandwidth to one or more network entities, for example, but not limited to, servers, web server, web portals, online platforms, web services, web sites hosted by one or more servers, e-commerce platforms, and/or the like.

One of ordinary skill in the art will appreciate that techniques consistent with the present disclosure are applicable in other contexts as well without departing from the scope of the disclosure. What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
a processor; and
a network bandwidth handler coupled to the processor, the network bandwidth handler to:
access time series distribution data comprising a distribution of data points corresponding to an average count of network packets over a pre-defined time period, wherein the average count of network packets is representative of network traffic at a server;
determine from the time series distribution data:
a trend data component comprising a distribution of a first set of data points indicative of an inherent trend of a first portion of the network traffic over the pre-defined time period,
a seasonal data component comprising distribution of a second set of data points indicative of recurring and persistent change in a pattern of a second portion of the network traffic over the pre-defined time period,
a cyclical data component comprising distribution of a third set of data points indicative of a third portion of the network traffic developed due to a predefined operational rule, and
an irregular data component comprising a fourth set of data points indicative of a fourth portion of the network traffic undefined by a definitive external factor;
compute baseline distribution traffic data indicative of a base count of network packets over the pre-defined time period, based on the trend data component, the cyclical data component, and the seasonal data component;
determine, using a local weighted regression, an estimated network traffic for a future time interval based on the baseline distribution traffic data, a lagged covariate factor, and covariate metrics, wherein the covariate metrics represent one or more external factors contributing to the network traffic over the pre-defined time period, wherein the pre-defined time period is a historical time period for which the time series distribution data is accessed, and wherein the lagged covariate factor is indicative of lagged versions of one or more of the covariate metrics; and
provide an estimated bandwidth for the future time interval based on the estimated network traffic to configure network settings of the server.

2. The system as claimed in claim 1 further comprising:
a dynamic bandwidth allocator coupled to the processor, the dynamic bandwidth allocator to allocate network bandwidth to the server based on pre-stored network traffic data applicable for the server and the estimated bandwidth for the future time interval.

3. The system as claimed in claim 2, further comprising:
a load balancer coupled to the processor, the load balancer to:
monitor current network traffic at the server; and
perform load balancing of the current network traffic at the server by distributing a portion of the current network traffic to a remote server, when the allocated network bandwidth is less than a desired network bandwidth to support the current network traffic.

4. The system as claimed in claim 1, wherein the network bandwidth handler comprises a data harmonizer coupled to the processor, the data harmonizer to collect the time series distribution data in a chronological order representing a distribution of the average count of network packets corresponding to the covariate metrics, at pre-defined time intervals of the pre-defined time period.

5. The system as claimed in claim 4, wherein the network bandwidth handler is to calculate the covariate metrics based on identifying external factors influencing the network traffic at an instance of time, and wherein the covariate metrics comprise at least one of: a size of a web page, a non-seasonal promotion, a count of images on the web page, a capability of the server, a load time interval for loading the web page, a ranking of the web page, and a performance of a search optimizer coupled to the server.

6. The system as claimed in claim 1, wherein the network bandwidth handler comprises:
a baseline traffic estimator coupled to the processor, the baseline traffic estimator to:
decompose the time series distribution data to obtain the trend data component, the seasonal data component, the cyclical data component, and the irregular data component; and
compute the baseline distribution traffic data, wherein the baseline distribution traffic data is a function of the trend data component, the seasonal data component, and the cyclical data component.

7. The system as claimed in claim 1, wherein the network bandwidth handler comprises a dynamic bandwidth estimator coupled to the processor, the dynamic bandwidth estimator to compute the lagged covariate factor based on an auto regression data component and a moving average data component, determined from the irregular data component, and wherein:

the auto regression data component comprises a distribution of a fifth set of data points indicative of regression of the fourth set of data points over a first lag time interval; and the moving an average data component comprises a distribution of a sixth set of data points indicative of regression of error values of the fourth set of data points over a second lag time interval.

8. The system as claimed in claim 7, wherein the network bandwidth handler comprises a lag parameter estimator coupled to the processor, the lag parameter estimator to:

access the irregular data component of the time series distribution data; and determine from the irregular data component, the auto regression data component based on an auto-correlation function (ACF), and the moving average data component based on a partial auto-correlation function (PACF).

9. The system as claimed in claim 8, wherein the lag parameter estimator is to:

construct using the ACF, a first plot representing a distribution of a first correlation value indicative of a first correlation between the network traffic at a first time instance and the network traffic at a second time instance subsequent to the first time instance;

construct using the PACF, a second plot representing a distribution of a second correlation value indicative of a second correlation between an error version associated with the network traffic at a third time instance and the error version associated with network traffic at a fourth time instance subsequent to the third time instance;

determine a first correlation parameter based on the first correlation value of the first plot and a first confidence threshold;

determine a second correlation parameter based on evaluation of the second correlation value of the second plot against a second confidence threshold; and compute the auto regression data component based on the first correlation parameter for a future time instance and the moving average data component for the future time instance based on the second correlation parameter.

10. A method comprising:

accessing, by a processor, time series distribution data comprising distribution of data points corresponding to an average count of network packets over a pre-defined time period, wherein the average count of network packets is representative of network traffic at a server;

determining, by the processor, from the time series distribution data, a trend data component comprising distribution of a first set of data points indicative of an inherent trend of a first portion of the network traffic over the pre-defined time period, a seasonal data component comprising distribution of a second set of data points indicative of recurring and persistent change in a pattern of a second portion of the network traffic over the pre-defined time period, a cyclical data component comprising distribution of a third set of data points indicative of a third portion of the network traffic developed due to a predefined operational rule, and an irregular data component comprising a fourth set of data points indicative of a fourth portion of the network traffic undefined by definitive external factor;

computing, by the processor, a baseline distribution traffic data indicative of a base count of network packets over the pre-defied time period, based on the trend data component, the cyclical data component, and the seasonal data component;

determining, using a local weighted regression, an estimated network traffic for a future time interval based on the baseline distribution traffic data, a lagged covariate factor, and covariate metrics, wherein the covariate metrics represent one or more external factors contributing to the network traffic over the pre-defined time period, wherein the pre-defined time period is a historical time period for which the time series distribution data is accessed, and wherein the lagged covariate factor is indicative of lagged versions of one or more of the covariate metrics; and providing an estimated bandwidth for the future time interval based on the estimated network traffic for the future time interval to configure network settings of the server.

11. The method as claimed in claim 10, further comprising:

allocating, by the processor, network bandwidth to the server based on pre-stored network traffic data applicable for the server and the estimated bandwidth for the future time interval.

12. The method as claimed in claim 11, further comprising:

monitoring, by the processor, current network traffic at the server; and performing, by the processor, load balancing of the current network traffic at the server by distributing a portion of the current network traffic to a remote server, when the allocated network bandwidth is less than a desired network bandwidth to support the current network traffic.

13. The method as claimed in claim 10, further comprising collecting, by the processor, the time series distribution data in a chronological order representing a distribution of the average count of network packets corresponding to the covariate metric at pre-defined time intervals of the pre-defined time period.

14. The method as claimed in claim 10, further comprising:

decomposing, by the processor, the time series distribution data to obtain, the trend data component, the seasonal data component, the cyclical data component, and the irregular data component; and computing, by the processor, the baseline distribution traffic data, wherein the baseline distribution traffic data is a function of: the trend data component, the seasonal data component, and the cyclical data component.

15. The method of claim 10 wherein providing the estimated bandwidth comprises computing, by the processor, the lagged covariate factor based on an auto regression data component and a moving average data component determined from the irregular data component, and wherein:

the auto regression data component comprises a distribution of a fifth set of data points indicative of regression of the fourth set of data points over a lag time interval, and the moving average data component comprises a distribution of a sixth set of data points indicative of regression of error values of the fourth set of data points over the lag time interval.

16. The method as claimed in claim 15, further comprising:

accessing, by the processor, the irregular data component of the time series distribution data; and determining, by the processor, from the irregular data component, the auto regression data component based on an auto-correlation function (ACF) and the moving average data component based on a partial auto-correlation function (PACF).

17. The method of claim 16, wherein determining the auto regression data component and the moving average data component further comprises:

constructing, by the processor, using the ACF, a first plot representing distribution of a first correlation value indicative of a first correlation between the network traffic at a first time instance and the network traffic at a second time instance subsequent to the first time instance;

constructing, by the processor, using the PACF, a second plot representing distribution of a second correlation value indicative of a second correlation between error version associated with the network traffic at a third time instance and the error version associated with network traffic at a fourth time instance subsequent to the third time instance;

determining, by the processor, a first correlation parameter based on evaluation of the first correlation value of the first plot, against a first confidence threshold;

determining, by the processor, a second correlation parameter based on evaluation of the second correlation value of the second plot against a second confidence threshold; and computing, by the processor, the auto regression data component based on the first correlation parameter for a future time instance and the moving average data component for the future time instance based on the second correlation parameter.

18. A non-transitory computer readable medium including machine readable instructions that are executable by a processor to:

access time series distribution data comprising distribution of data points corresponding to an average count of network packets over a pre-defined time period, wherein the average count of network packets is representative of network traffic at a server;

determine from the time series distribution data, a trend data component comprising distribution of a first set of data points indicative of an inherent trend of a first portion of the network traffic over the pre-defined time period, a seasonal data component comprising distribution of a second set of data points indicative of recurring and persistent change in a pattern of a second portion of the network traffic over the pre-defined time period, a cyclical data component comprising distribution of a third set of data points indicative of a third portion of the network traffic developed due to a predefined operational rule, and an irregular data component comprising a fourth set of data points indicative of a fourth portion of the network traffic undefined by definitive external factor;

compute a baseline distribution traffic data indicative of a base count of network packets over the pre-defined time period, based on the trend data component, the cyclical data component, and the seasonal data component;

determine using a local weighted regression, an estimated network traffic for a future time interval based on the baseline distribution traffic data, a lagged covariate factor, and covariate metrics, wherein the covariate metrics represent one or more external factors contributing to the network traffic over the pre-defined time period, wherein the pre-defined time period is a historical time period for which the time series distribution data is accessed, and wherein the lagged covariate factor is indicative of lagged versions of one or more of the covariate metrics; and provide an estimated bandwidth for the future time interval based on the estimated network traffic for the future time interval to configure network settings of the server.

19. The non-transitory computer-readable medium of claim 18, wherein to provide the estimated bandwidth, the machine readable instructions that are executable by the processor is to further compute, the lagged covariate factor based on an auto regression data component and a moving average data component determined from the irregular data component, and wherein:

the auto regression data component comprises a distribution of a fifth set of data points indicative of regression of the fourth set of data points over a lag time interval, and the moving average data component comprises a distribution of a sixth set of data points indicative of regression of error values of the fourth set of data points over the lag time interval.

20. The non-transitory computer-readable medium of claim 18, wherein the machine readable instructions are executable by the processor to further allocate network bandwidth to the server based on pre-stored network traffic data applicable for the server and the estimated bandwidth for the future time interval.

* * * * *